INVENTOR.
WALTER H. BOCKWOLDT,
BY
Robert Thompson
ATTORNEY.

6 PT.

| | A | B | C | D | E | F | G | H | I | J | K | L | M | N | O | P | A | B | C | D | E |
|---|---|---|---|---|---|---|---|---|---|---|---|---|---|---|---|---|---|---|---|---|---|
| 1 | 1 | 5 | 9 | 13 | 2 | 6 | 10 | 14 | 3 | 7 | 11 | 15 | 4 | 8 | 12 | 16 | 1 | 5 | 9 | 13 | 2 |
| 2 | 15 | 11 | 4 | 8 | 12 | 16 | 1 | 5 | 9 | 13 | 2 | 6 | 10 | 14 | 3 | 7 | 15 | 11 | 4 | 8 | |
| 3 | 6 | 2 | 10 | 14 | 3 | 7 | 15 | 11 | 4 | 8 | 12 | 16 | 1 | 5 | 9 | 13 | 6 | 2 | 10 | | |
| 4 | 16 | 12 | 1 | 5 | 9 | 13 | 6 | 2 | 10 | 14 | 3 | 7 | 15 | 11 | 4 | 8 | 16 | 12 | | | |
| 5 | 7 | 3 | 15 | 11 | 4 | 8 | 16 | 12 | 1 | 5 | 9 | 13 | 6 | 2 | 10 | 14 | 7 | | | | |
| 6 | 13 | 9 | 6 | 2 | 10 | 14 | 7 | 3 | 15 | 11 | 4 | 8 | 16 | 12 | 1 | 5 | | | | | |
| 7 | 8 | 4 | 16 | 12 | 1 | 5 | 13 | 9 | 6 | 2 | 10 | 14 | 7 | 3 | 15 | 11 | | | | | |
| 8 | 14 | 10 | 7 | 3 | 15 | 11 | 8 | 4 | 16 | 12 | 1 | 5 | 13 | 9 | 6 | 2 | | | | | |
| 9 | 5 | 1 | 13 | 9 | 6 | 2 | 14 | 10 | 7 | 3 | 15 | 11 | 8 | 4 | 16 | 12 | | | | | |
| 10 | 11 | 15 | 8 | 4 | 16 | 12 | 5 | 1 | 13 | 9 | 6 | 2 | 14 | 10 | 7 | 3 | | | | | |
| 11 | 2 | 6 | 14 | 10 | 7 | 3 | 11 | 15 | 8 | 4 | 16 | 12 | 5 | 1 | 13 | 9 | | | | | |
| 12 | 12 | 16 | 5 | 1 | 13 | 9 | 2 | 6 | 14 | 10 | 7 | 3 | 11 | 15 | 8 | 4 | | | | | |
| 13 | 3 | 7 | 11 | 15 | 8 | 4 | 12 | 16 | 1 | 5 | 13 | 9 | 2 | 6 | 14 | 10 | | | | | |
| 14 | 9 | 13 | 2 | 6 | 14 | 10 | 3 | 7 | 11 | 15 | 8 | 4 | 12 | 16 | 5 | 1 | | | | | |
| 15 | 4 | 8 | 12 | 16 | 5 | 1 | 9 | 13 | 2 | 6 | 14 | 10 | 3 | 7 | 11 | 15 | | | | | |
| 16 | 10 | 14 | 3 | 7 | 11 | 15 | 4 | 8 | 12 | 16 | 5 | 1 | 9 | 13 | 2 | 6 | | | | | |
| 17 | 1 | 5 | 9 | 13 | | | | | | | | | | | | | | | | | |
| 18 | 15 | 11 | | | | | | | | | | | | | | | | | | | |
| | 6 | | | | | | | | | | | | | | | | | | | | |

Sept. 30, 1969 W. H. BOCKWOLDT 3,470,313

NARROW BANDWIDTH VIDEO

Filed May 13, 1966 14 Sheets-Sheet 3

Sept. 30, 1969 W. H. BOCKWOLDT 3,470,313

NARROW BANDWIDTH VIDEO

Filed May 13, 1966 14 Sheets-Sheet 7

Sept. 30, 1969 W. H. BOCKWOLDT 3,470,313

NARROW BANDWIDTH VIDEO

Filed May 13, 1966 14 Sheets-Sheet

Sept. 30, 1969 W. H. BOCKWOLDT 3,470,313

NARROW BANDWIDTH VIDEO

Filed May 13, 1966 14 Sheets-Sheet 13

United States Patent Office 3,470,313
Patented Sept. 30, 1969

3,470,313
NARROW BANDWIDTH VIDEO
Walter H. Bockwoldt, Woodland Hills, Calif., assignor, by mesne assignments, to the United States of America as represented by the Administrator of the National Aeronautics and Space Administration
Filed May 13, 1966, Ser. No. 554,277
Int. Cl. H04n 7/12
U.S. Cl. 178—6 13 Claims

ABSTRACT OF THE DISCLOSURE

This is a television system in which the video signal is sampled for recording on separate tracks of a magnetic storage means to form a plurality of low resolution spatially interrelated video frames. When the tracks of video information are played back in time-base synchronism, the video information contained therein is interlaced horizontally and vertically to provide high resolution video information. In addition, the number of tracks of low resolution video information played back at any instant of time can be selectively controlled and the background brightness level can be controlled.

This invention relates generally to improvements in narrow bandwidth television systems and, particularly, to improvements in a receiver of a narrow bandwidth television system. The invention described herein was made in the performance of work under a NASA contract and is subject to the provisions of Sec. 305 of the National Aeronautics & Space Act of 1958, Public Law 85–568 (72 Stat. 435; 42 U.S.C. 2457).

In the field of television, it is sometimes desirable to reduce the bandwidth requirement of a video signal without undesirably affecting the intelligibility of the picture. In copending patent application, Ser. No. 338,770, filed Jan. 20, 1964, of which Walter H. Bockwoldt is a co-inventor, such bandwidth reduction was accomplished by encoding the video information in a spatial pattern in which one out of every $n$ (sixteen) information areas was sampled in pseudo-random pattern such that every elemental information area of the total picture area was sampled once every $n$ (sixteen) low resolution frames. When these sixteen low resolution fields were combined by interlacing them or superimposing them, the information contained therein complemented and formed a high resolution frame once every $n$ (sixteen) fields. Thereafter, this sampling pattern was continually repeated every $n$ (sixteen) frames.

Of course, systems could be made to operate in other modes in which portions of a frame are sampled in a fixed or sequential pattern which is continually repeated rather than in a pseudo-random pattern. In such a mode of operation, the picture elements $l$ through $n$ are sequentially transmitted and stored on channels $l$ through $n$, respectively, at the receiver. Of course, this is not necessarily an optimum mode of operation, and other modes of operation can be implemented.

An object of this invention is to provide improvements in the above-described type of narrow bandwidth television systems.

Another object is to provide an improved means for playing back or reconstructing a narrow-band television signal of the above-described type.

Still another object is to provide an improved means for playing back and reconstructing a narrow-band television signal of the above-described type in which the reconstructed signal can be varied or optimized for a variety of picture conditions ranging from fast-moving objects to still scenes.

Yet another object is to provide an improved means for fully utilizing narrow bandwidth storage density limitations of a recording medium when recording a relatively wide bandwidth signal.

Other objectives of this invention may be attained by providing a television system of the type including a transmitter subsystem having a television camera and encoder, and the combination therewith of a receiver subsystem having a storage device and a decoder.

In operation, the transmitter subsystem encodes the video information by the pseudo-random multiple interlace sampling technique, the encoded video information being transmitted as $n$ low resolution frames of video information which complement one another and which are repeated once every sixteen frames.

The receiver subsystem includes a magnetic recording drum having a plurality of $n$ parallel recording channels which are selectively enabled to record separate ones of the low resolution frames. The recorded information is continually reproduced by $n$ parallel reproduce channels which play back the individual frames of low resolution video information in time-base synchronism with one another. In reconstructing an image, the time-base synchronized video information is sampled in accordance with the pseudo-random pattern and is combined into interlaced video information which corresponds to a higher resolution image than the resolution of a single low resolution frame. This composite signal can be utilized for display purposes.

In addition, to optimize the viewability of the resulting picture for a variety of viewing conditions ranging from still scenes to rapidly moving objects, the number of frames of video information that are reproduced at any instant of time can be adjusted. This adjustment can be accomplished by varying the number of times that a frame of low resolution video information is continually reproduced. For example, for full storage, each frame of low resolution video information would be reproduced sixteen times before it was replaced with updated video information. For one-half storage, a low resolution frame would only be reproduced eight times; and for one-quarter storage, the low resolution frame of video information would only be reproduced four times.

Other objects, features, and advantages of this invention will become apparent upon reading the following detailed description of an embodiment and referring to the accompanying drawings in which.

FIGS. 7$a$ and 7$b$ are timing charts showing the signal waveforms utilized for the various operations of the circuits.

Figure 1:
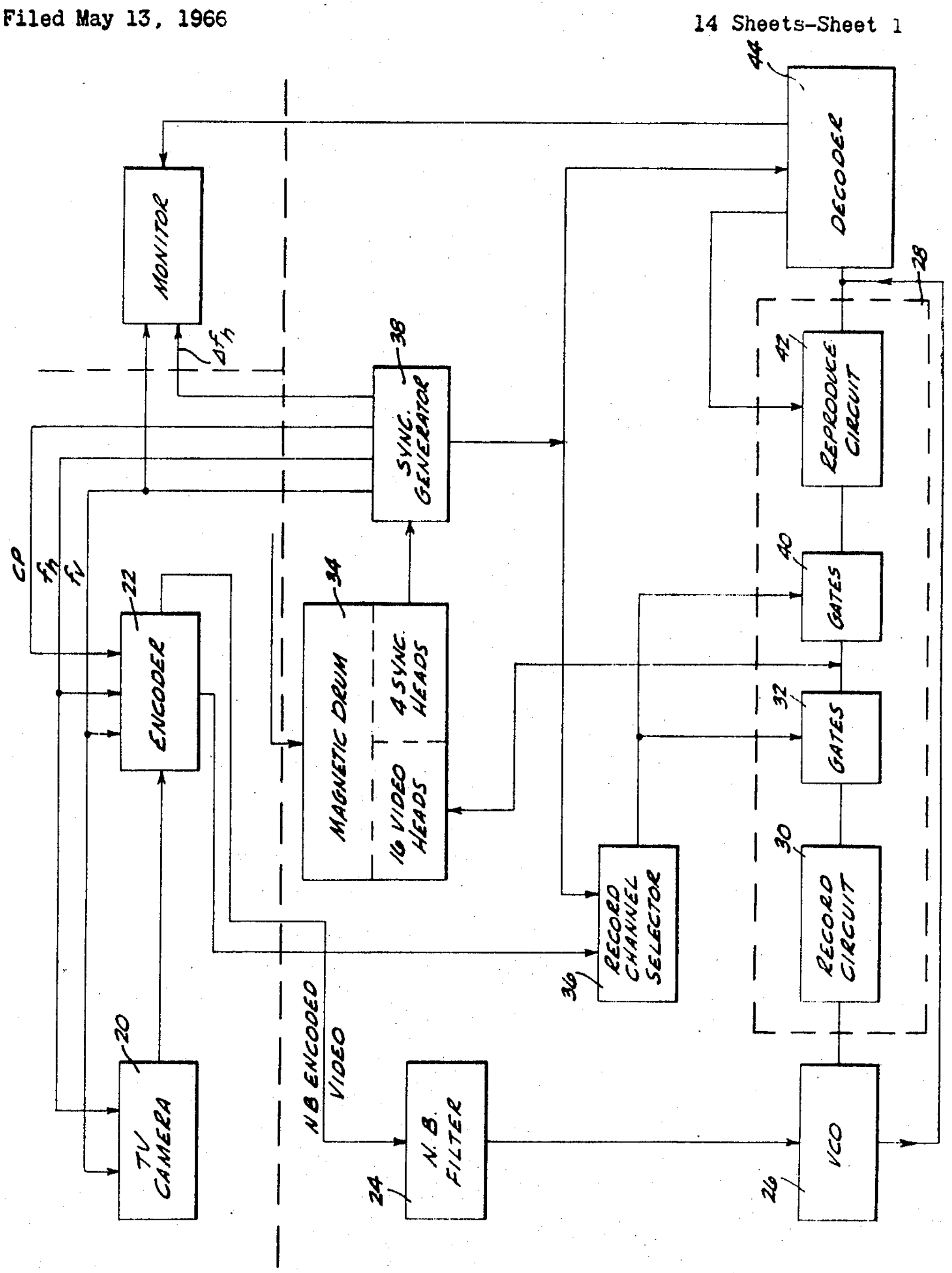
FIG. 1 is an overall block diagram illustrating the relationship between the portions of the system in combination.
Figure 8:
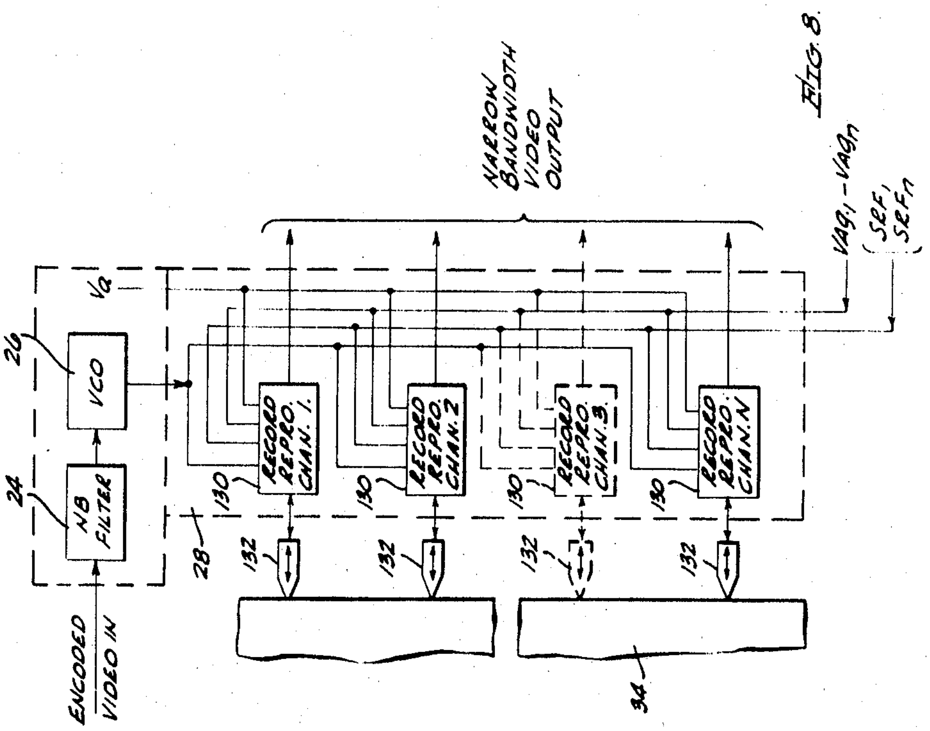
Figure 9:
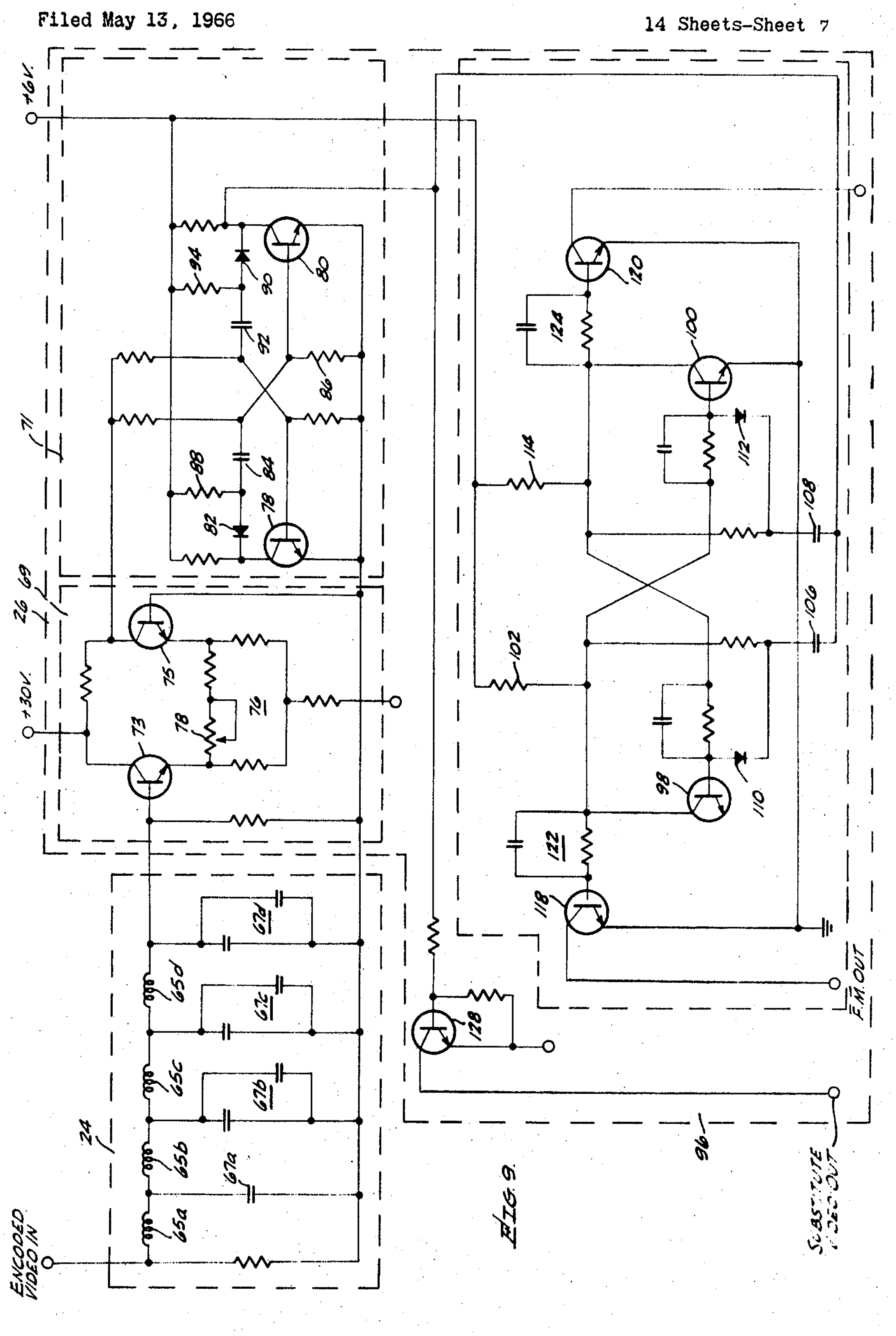
Figure 10A:
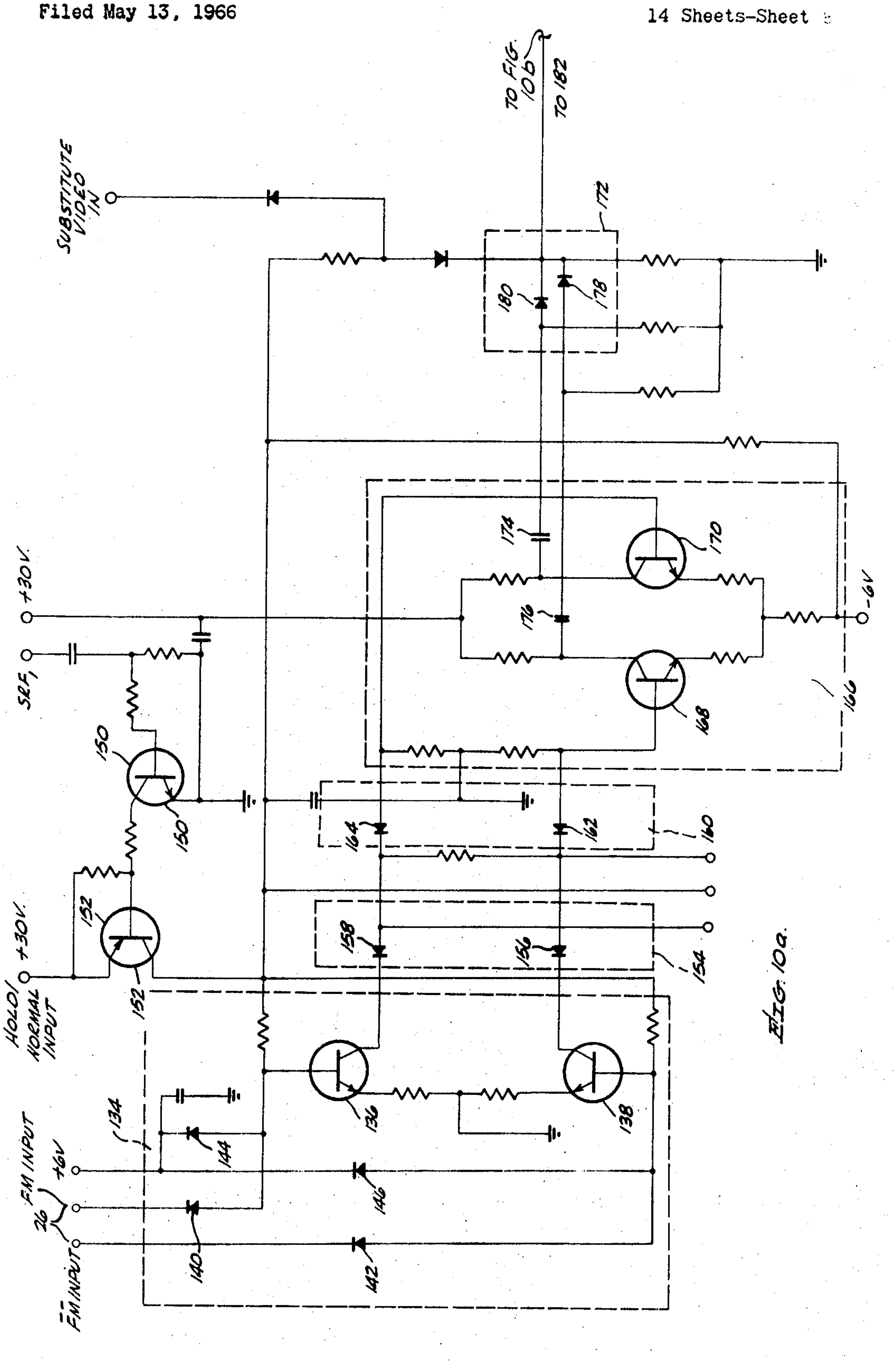
Figure 10B:
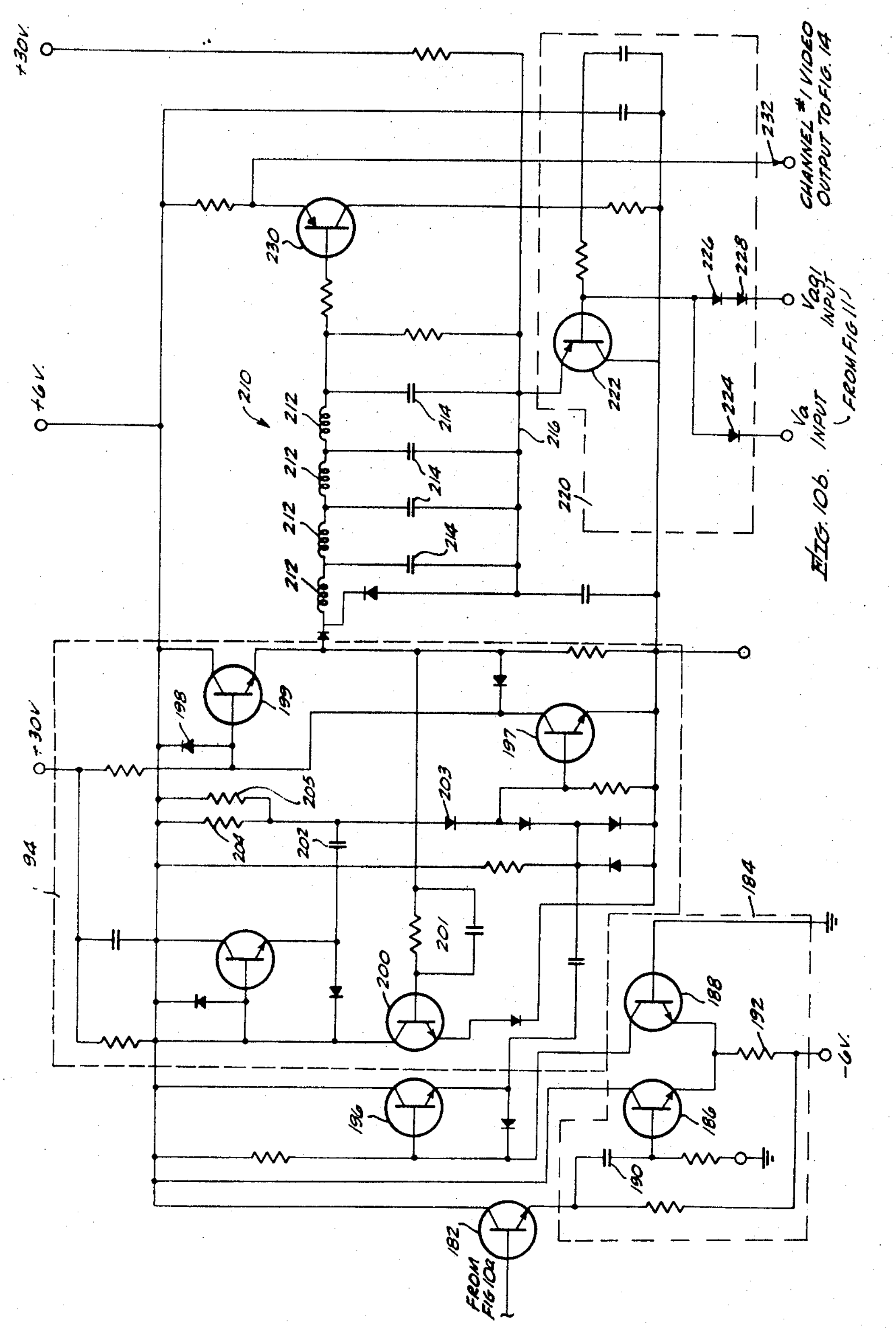
Figure 11A:
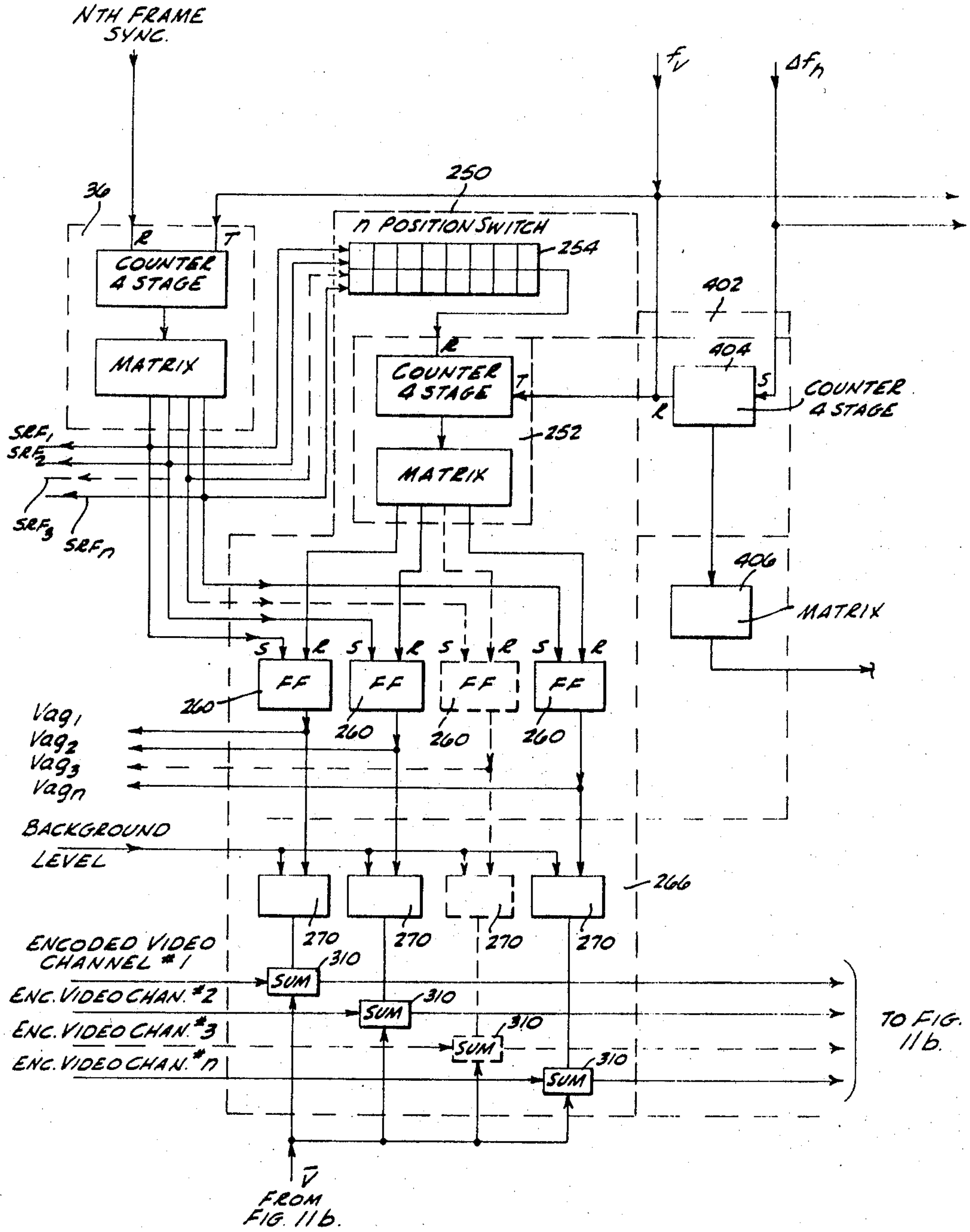
Figure 11B:
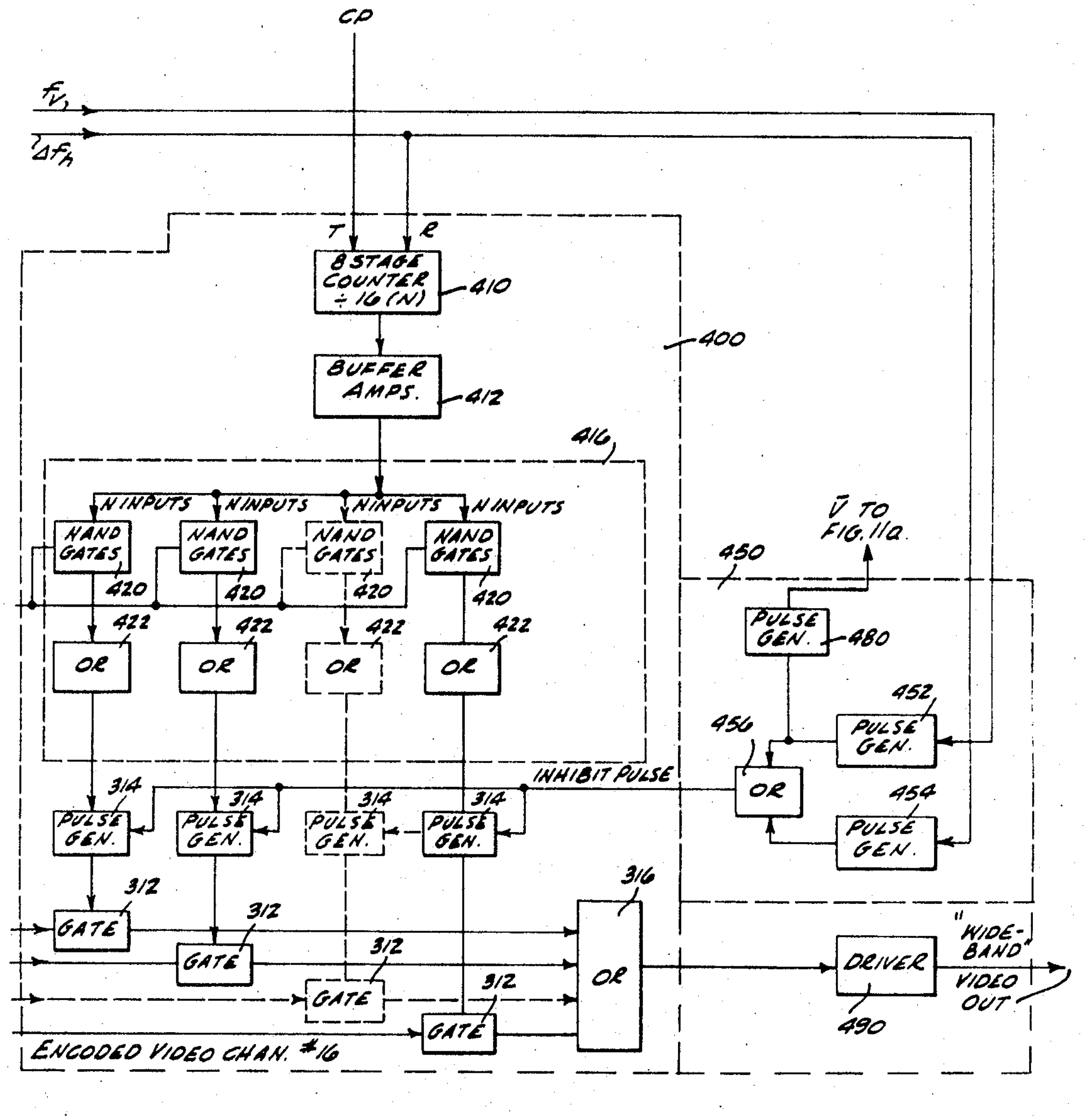
Figure 12A:
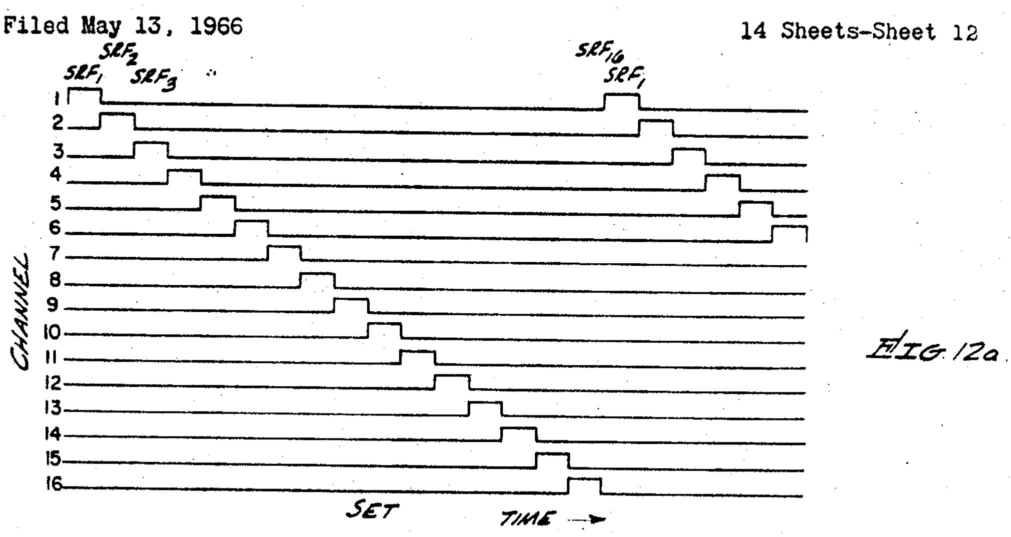
Figure 12B:
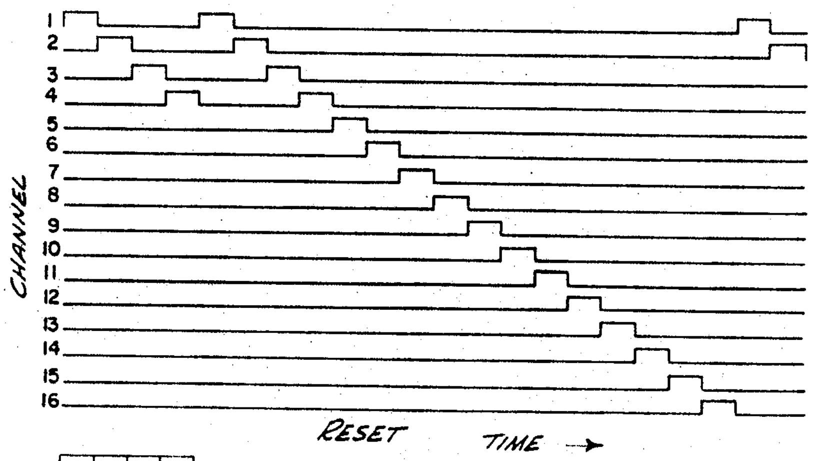
Figure 12C:
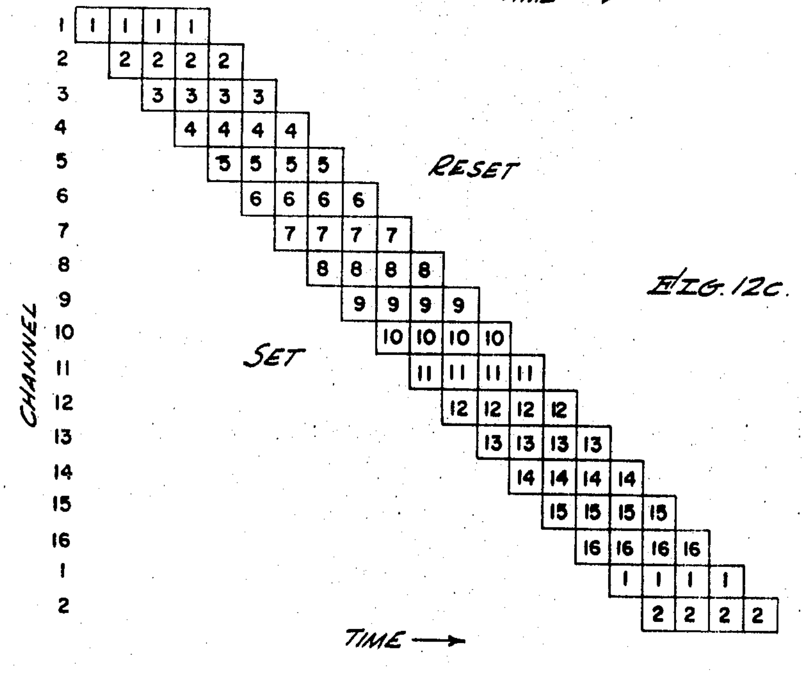
Figures 13, 14, 15:
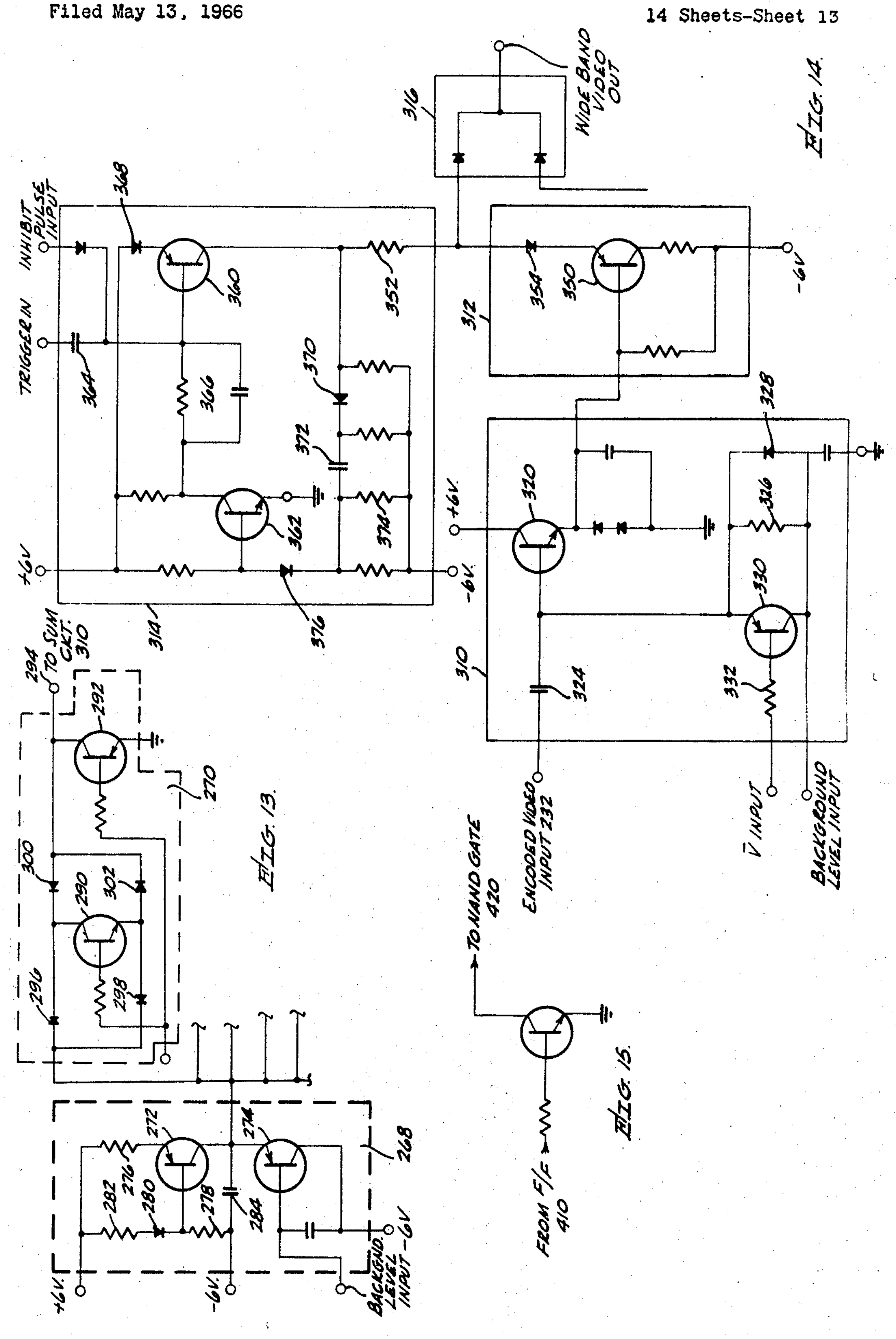
Figures 16, 17:
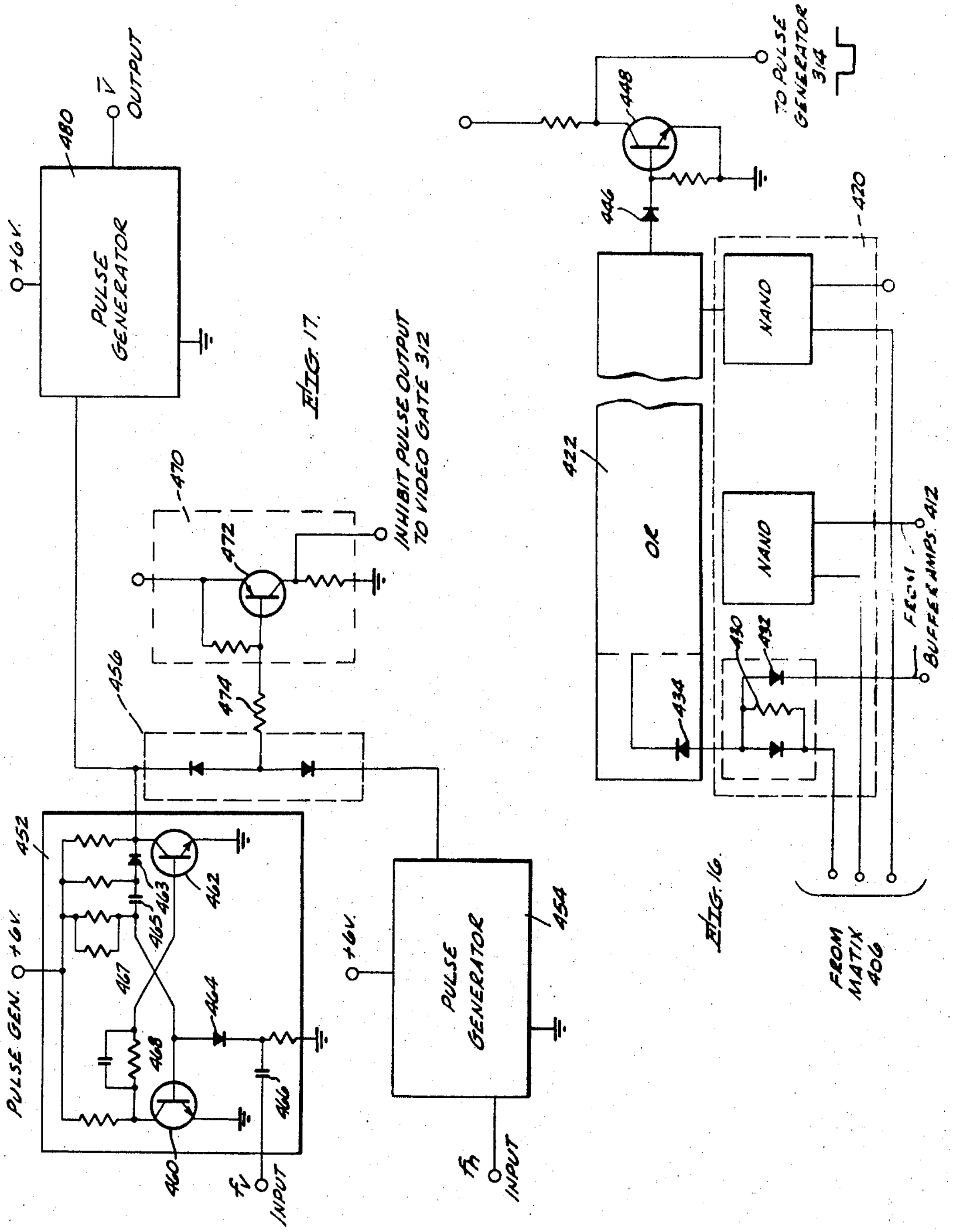

FIG. 8 is a block diagram illustrating the relationship between the record/reproduce circuits associated with each distinct channel of the magnetic drum;

FIG. 9 is a detailed schematic of the input filter and the voltage control oscillator ilustrated in FIG. 1 and FIG. 8;

FIGS. 10*a* and 10*b* are detailed schematic diagrams illustrating the record/reproduce amplifiers and logic gate associated with one of the magnetic recording channels;

FIGS. 11*a* and 11*b* are block diagrams illustrating the decoder;

FIGS. 12*a*, 12*b*, and 12*c* are timing charts illustrating the relationship of the control signals for a one-fourth storage mode of operation;

FIG. 13 is a detailed schematic of a brightness level control circuit for a representative one of the video channels;

FIG. 14 is a detailed schematic of a portion of a video channel containing the summing circuit, the video gate, the pulse generator, and the OR gate illustrated in FIG. 11;

FIG. 15 is a schematic diagram of a buffer amplifier associated with the ÷16 circuit illustrated in FIG. 11;

FIG. 16 is a schematic diagram showing the relationship of the NAND gate and OR gate associated with one of the video channels in the decoder of FIG. 11;

FIG. 17 is a schematic diagram of the inhibit pulse generator illustrated in the decoder of FIG. 11.

Referring now to the drawings, FIG. 1 is a block diagram of a television system that operates on the pseudo-random multiple interlace principle. In operation, video information received by a television camera 20 is converted to electrical signals in a conventional raster scan technique and fed to an encoder 22. The encoder 22 processes the received video information into a series of low resolution frames of video information by means of the psuedo-random multiple interlace technique.

Although the pseudo-random multiple interlace technique is described in the previously referenced copending U.S. patent application, Ser. No. 338,770, reference is made to FIGS. 2 and 3 which illustrate an elemental sampling area (FIG. 3) of the total picture (FIG. 2) received from the television camera 20 by the encoder 22. For purposes of a convenient starting point in explaining the pseudo-random sampling technique, the graph of FIG. 3 can be arbitrarily considered to be a greatly enlarged representation of the upper, left-hand corner of the video picture and can be considered to be identical to all other sampling areas. Considering then that the full resolution picture signal from the television camera 20 is generated by a conventional horizontal raster scan from left to right and that the horizontal raster lines are scanned in sequence from top to bottom, the small blocks containing the numbers 1 through 16 each represents an elemental video information bit wherein the specific number contained within the block represents the number of the low resolution frame during which that particular elemental information area is sampled.

Thus, the encoder 22, on the first low resolution frame, samples the first information area on the first horizontal scan line. The next fifteen information areas represented by the horizontal coordinate markings B–P are blank. When, however, the seventeenth information area on the first horizontal scan line, represented by the second horizontal coordinate marking A is scanned, the encoder again samples the video information during this particular time interval and is thereafter again blanked for the next fifteen time intervals. This sampling process is continually repeated for the entire first horizontal scan line and provides a 1/16 resolution horizontal raster line. At the end of the first horizontal raster line, the raster scan steps down to the second horizontal scan line.

On the second horizontal raster line of the first low resolution frame, the first six information areas, represented by the coordinate markings A–F are blanked and the seventh information area, represented by the horizontal coordinate marking G is sampled. Thereafter, the next fifteen information areas are blanked until the second horizontal coordinate marking G (not shown) is reached. At this time, the video information will be again sampled. At the end of the second horizontal raster scan, the raster scan steps down to the third horizontal line and again scans from left to right.

On the third horizontal raster scan line of the first low resolution frame, the first twelve information areas, represented by the horizontal coordinate marking A–L are blanked. When the thirteenth information area, represented by the horizontal coordinate marking M is scanned, it is sampled. Thereafter, the next fifteen information areas on the third horizontal scan line are blanked. When the thirteenth information area of the second elemental picture area (not shown) is reached, it is sampled, and so on.

After all of the horizontal raster lines have been scanned on the first low resolution frame, the horizontal raster scan goes back to the first horizontal raster line and the sequential horizontal raster scanning process is repeated.

On the second frame, the encoder 22 is operable to blank the first four information areas, represented by the horizontal coordinate markings A–D, and to sample the fifth horizontal information area, represented by the horizontal coordinate E. Thereafter, the next fifteen horizontal information areas are blanked until the fifth information area E of the second elemental picture area is reached. At this time, the video information is again sampled, as represented by the number 2 within the block.

This encoding process continues for sixteen frames and is then repeated or recurs. For purposes of understanding this sampling technique, it is sufficient at this time to note that the numeral contained within the information block represents the frame numbers 1 through 16. It should also be noted that at the end of sixteen low resolution frames, all of the information areas are sampled and thus, if they were combined and displayed simultaneously in a superimposed or horizontally-interlaced and vertically-interlaced pattern, they would create a full resolution image.

Referring back to the television system illustrated in FIG. 1, the encoded video information is transmitted to a receiver subsystem on a transmission link which is, for the purpose of simplifying the description, represented by a wire. It should of course be understood that many types of transmission links could be utilized.

The receiver subsystem receives the encoded video information and reconstructs an image or display by combining the sequentially received frames of low resolution information into frames of selected resolution. In operation, the encoded video information is fed through a narrow bandwidth filter 24 to a voltage-controlled oscillator 26 which produces an FM (frequency modulated) signal having an instantaneous frequency that is a function of the instantaneous amplitude of the encoded video information. The FM signal is fed to a 16-channel record/reproduce circuit 28.

The record/reproduce circuit 28 includes a recording circuit 30 which receives the FM signal from the voltage-controlled oscillator 26 and simultaneously applies it to input terminals of a gate circuit 32 that includes sixteen parallel outputs—one for each channel. In effect, the gates 32 are sequentially enabled or turned on so that each sequentially received frame of encoded video information is recorded on a distinct recording track of a magnetic recording medium such as magnetic storage drum 34 during one drum revolution. The gates 32 are selectively enabled by means of a record channel selector 36 which is synchronized with the frames of encoded video information by means of a synchronizing signal that indicates the end of every sixteenth frame and synchronizing signals generated by a sync generator 38. Once the low resolution video frame has been recorded on a parallel magnetic recording channel, it is maintained thereon and can be reproduced during the next fifteen revolutions of the magnetic drum. During the fifteen revolutions of the drum, the next fifteen low resolution video frames are sequentially recorded on fifteen other parallel recording channels. On the sixteenth low resolution frame, the video information recorded on a track 16 frames ago is erased and replaced with a new frame of low resolution video information. Thus, the sixteen frames of low resolution video information can be continually reproduced until sequentially updated with new low resolution video information.

In the reproduce mode of operation, the sixteen channels of low resolution video information can be continuously reproduced in parallel and are simultaneously fed to sixteen parallel gates 40 in time-base synchronism with one another. In operation, the gates 40 simultaneously receive the low resolution frames of video information from all of the recording channels except that channel which is recording new video information. When a particular recording channel is in a record mode of operation, the reproduce amplifier circuit is gated off by a signal from the record channel selector 36 and the video signal being recorded is fed directly to the reproduce circuit 42.

The reproduce circuit 42 can simultaneously play back the fifteen frames of low resolution video information received through the enabled gate 40 plus the video information being recorded. As a result, the frames of low resolution video information are played back on parallel channels in time-base synchronism with one another. These information signals are fed in parallel to a decoder 44. The decoder 44 selectively combines the received frames of low resolution video information into a single wideband video signal. In operation, sixteen parallel sample gates are all coupled to the inputs of an OR gate which has a single output. The combined video information output from the decoder 44 can, at a maximum, correspond to a full resolution picture represented graphically by FIGS. 2 and 3. There will, however, be a sixteen-frame real time delay from the first frame of a low resolution video information making up a portion of the composite video information to the sixteenth low resolution frame.

The duration of the composite full resolution reproduced video signal will not be troublesome for still scenes or very slowly changing scenes. The time duration may, however, be troublesome for scenes of fast-moving objects or fast-moving scenes, since the horizontal and vertical interlace between the information on the first low resolution frame and the information on subsequent low resolution frames would be degraded. As a result, the image could appear to break up.

To compensate for a variety of viewing conditions varying from a still scene to a rapidly moving object or scene, the decoder 44 can be adjusted to obtain video information at a reduced picture resolution. In operation, this is attained by adjustably changing the number of times a recorded low resolution frame is continuously reproduced by the reproduce circuit 42.

In addition, to keep the composite image from going to black as the frame resolution is decreased, the background brightness can be increased by the operator.

Another feature is that a single frame of video information can be held and continually played back.

The sync signal generator 38 generates a clock pulse CP, a horizontal sync signal $f_h$, and a vertical sync signal $f_v$ in response to a plurality of corresponding synchronizing signals recorded on separate channels of the magnetic drum 34. These sync signals are utilized to control the operation of the transmitter subsystem and the receiver subsystem, as will be explained in more detail shortly. It should of course be understood that in certain embodiments the synchronizing signal would actually be generated at the television camera and encoder rather than at the receiver, and would be transmitted to the receiver, as described in copending U.S. patent application Ser. No. 338,770. With this latter technique, the clock pulse synchronizing signal could be utilized to control and stabilize the drum speed, thereby keeping it in synchronism with a high degree of time-base stability.

Having covered the overall relationship between the portions in the system, the details of the system components will now be described.

Although the detailed circuits of components in the transmitter subsystem, including the television camera 20 and the encoder circuit 22 which operate on the pseudo-random multiple interlace technique, are described in detail in the previously referenced copending patent application, Ser. No. 338,770, they are again described briefly with reference to FIG. 4 in order to facilitate a full understanding of the operation of the described embodiment and to aid in defining the scope of the invention.

Figure 4:
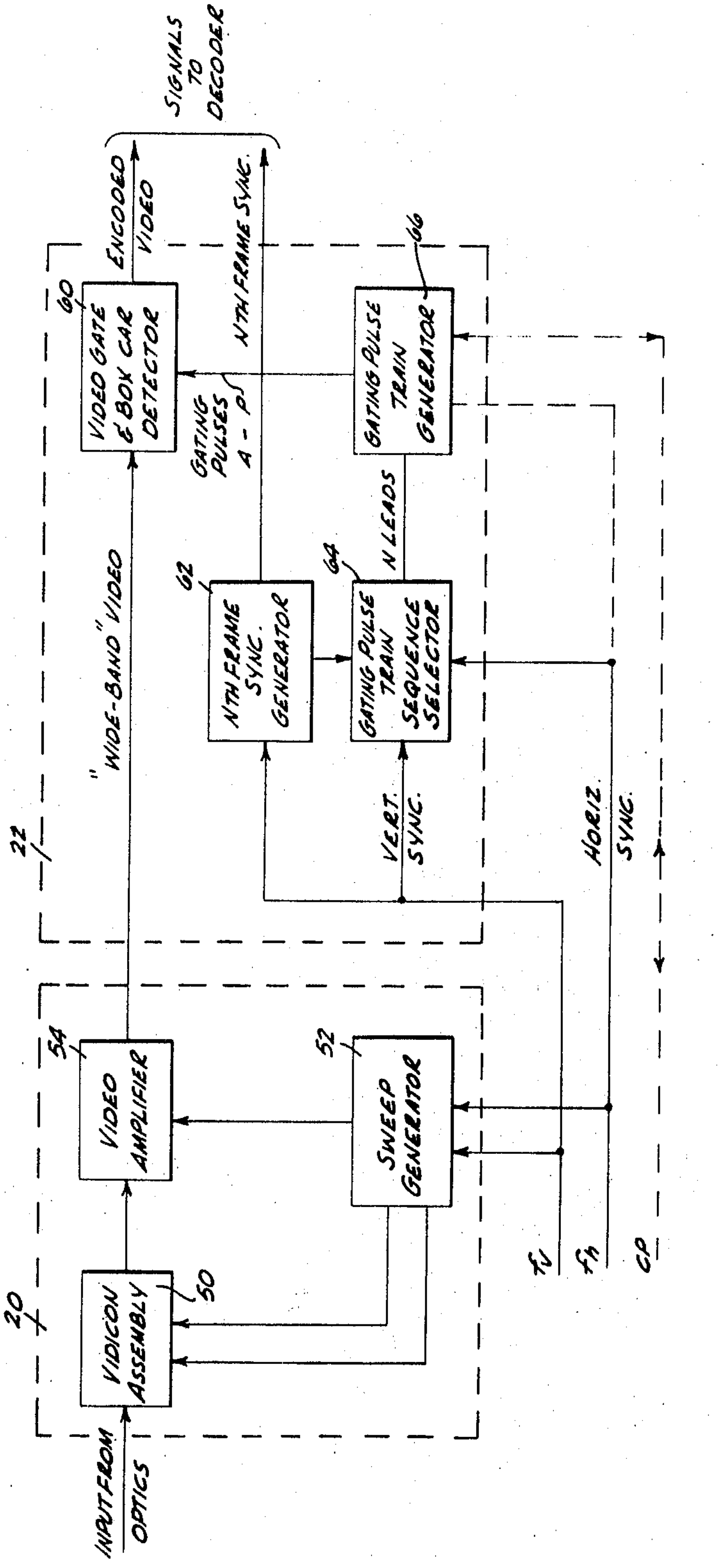
FIG. 4 is a block digaram of the transmitter subsystem showing the circuit relationship between the television camera and the encoder.
Figure 5:
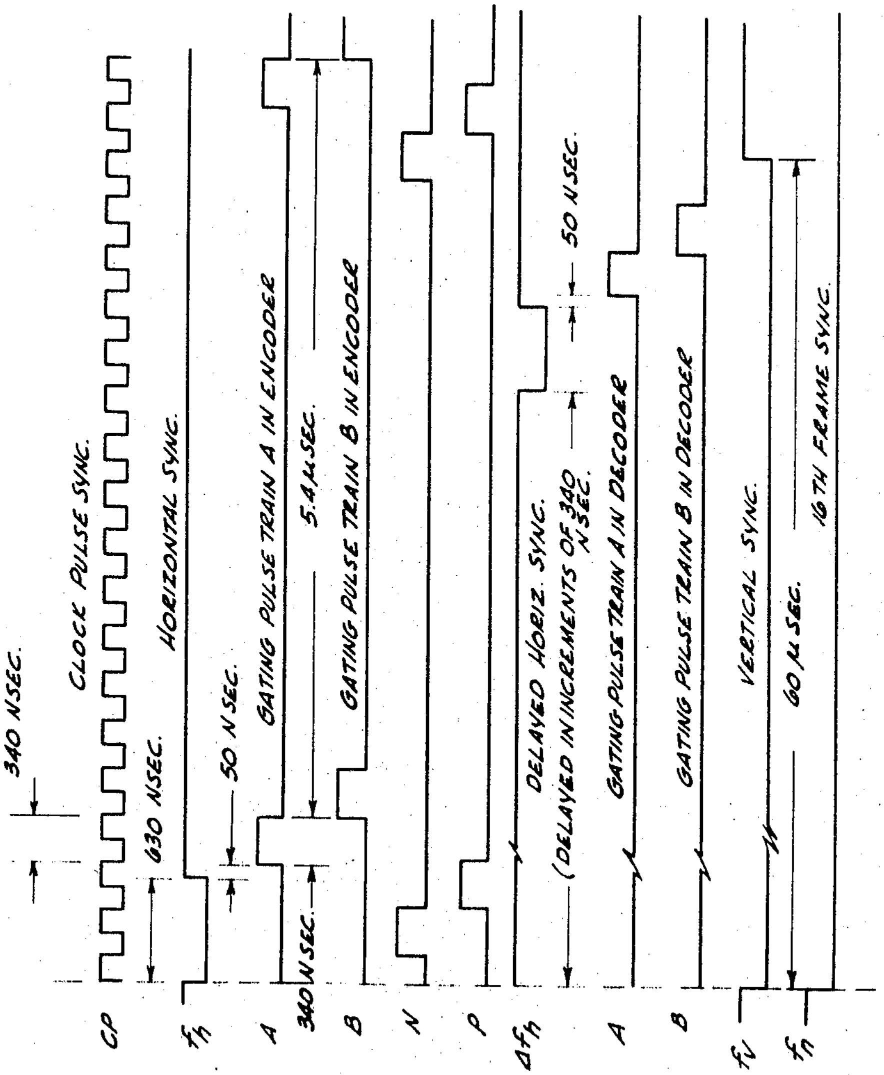
FIG. 5 is a timing chart showing the waveforms of the signals generated by the sync signal generator of FIG. 6 and the encoder of FIG. 4.
Figure 6:
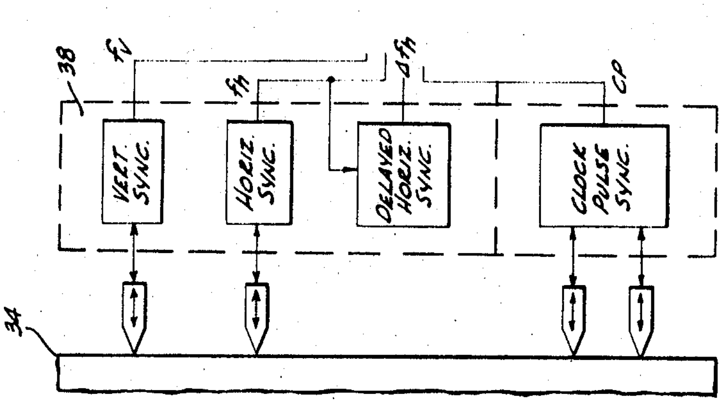
FIG. 6 is a diagram illustrating one embodiment of a sync signal generator.

The transmitter subsystem illustrated in FIG. 4 includes the television camera 20 and the encoder 22 which are operably controlled by the sync signals (FIG. 5) generated at the sync signal generator 38 illustrated in FIG. 6.

The camera 20 is a vidicon operated on a horizontal raster scan basis in which the camera sweeps are synchronized with the horizontal sync signal $f_h$ and vertical sync signal $f_v$.

The circuit for generating the horizontal sync signal $f_h$ and vertical sync signal $f_v$, illustrated in FIG. 6, operably includes a portion of the magnetic drum 34 (FIG. 1) having separate sync signals recorded on separate channels or tracks. In essence, the sync signals recorded on the tracks include: one vertical sync pulse $f_v$ per drum revolution which will be played back at 30 Hz; horizontal sync pulses $f_v$ having a frequency of approximately 7.68 kHz. when the drum is operated at a desired normal speed; and two tracks of clock pulses CP, each at 735 kHz. These recorded signals, when played back, provide the vertical sync signal $f_v$, the horizontal sync signal $f_h$, and the clock pulse frequencies CP, that control the operation of the system.

Figure 7A:
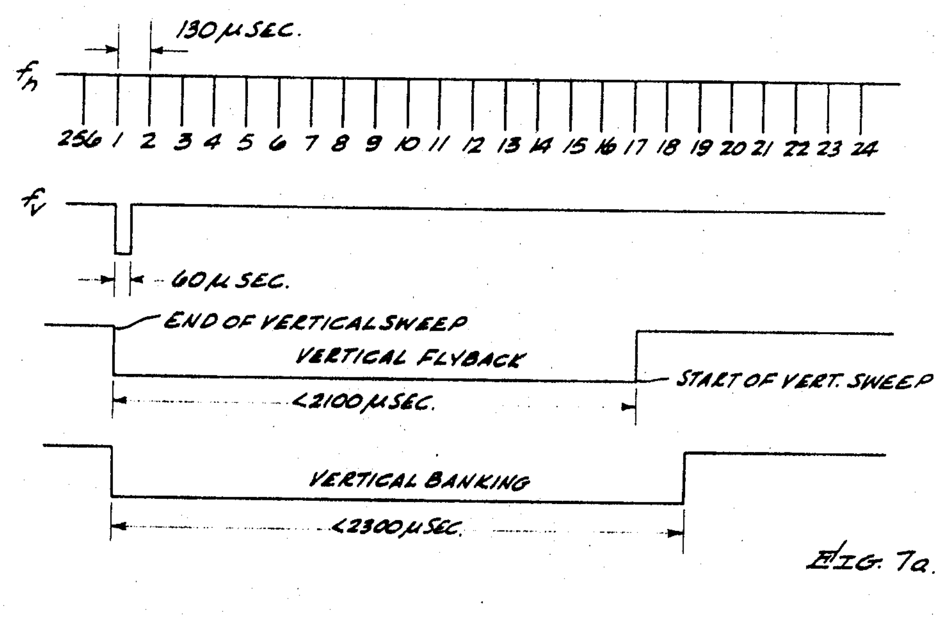
Figure 7B:
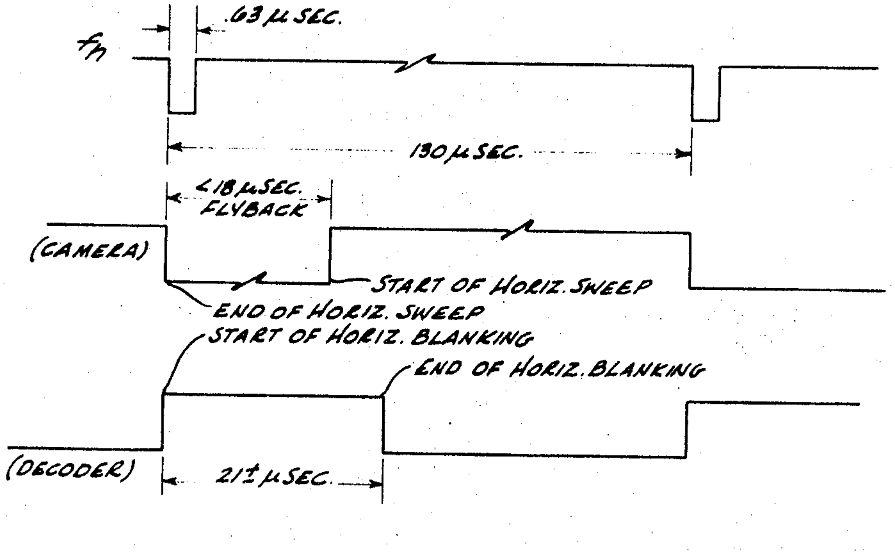

As is typical in the operation of the vidicon camera 20, if the picture has a 256-line resolution, a vertical sync pulse $f_v$ is generated after the 256th horizontal sync pulse $f_h$, as illustrated in the compressed time scale graph of FIG. 7*a*. Thereafter, during the vertical flyback, the vidicon beam is blanked by a signal from the sweep generator for a predetermined time duration to ensure that no video information is read during the vertical flyback. In addition, as illustrated in the graph of FIG. 7*b*, the vidicon beam is blanked on the horizontal flyback to prevent erroneous readings of the information on the vidicon. This particular technique enabled the vidicon 50 to generate an electrical signal for the vidicon picture corresponding to a resolution of 256-lines-per-frame with at least 384 picture elements per horizontal lines at 30-frames-per-second in one subsystem that has been built.

A video amplifier 52 receives the vidicon output and amplifies the signal amplitude to a level that is usable by the encoder 22. In essence, the instantaneous amplitude of the individual full resolution video signal is proportional to the intensity of the light at a corresponding element of a scene viewed by the vidicon assembly 50. In addition to amplifying the vidicon output signal, the flyback and blanking signals generated by the sweep generators 52 are added to the video in the video amplifier 54 and transmitted therewith.

The encoder circuit 22 receives the full resolution video from the television camera 20 to selectively gate or encode discrete portions of the full resolution video signal through video gate and boxcar detector 60 to form the low resolution pseudo-random, multiple-interlace signal described with reference to the graphs of FIG. 2 and FIG. 3. The encoder 22 is operably controlled by the vertical sync signal $f_v$, the horizontal sync signal $f_h$, and the clock pulse sync signal CP in the following manner.

An nth frame sync signal generator 62 generates an output pulse at the end of every nth frame. Since, in this description, $n$ has been selected to represent sixteen a conventional ÷16 circuit, such as a four-stage, flip-flop counter, generates an output pulse every time sixteen vertical pulses $f_v$ are received. This ÷16 pulse can trigger a monostable multivibrator to generate the 16-frame sync signal, which is applied to a gating pulse train sequence selector 64.

The gating pulse train sequence selector 64 generates output pulses that control the sequence of the sample times of the gating pulses generated by a gating pulse train generator from line-to-line and frame-to-frame. For example, although the gating pulse train from a gating pulse train generator 66 always fellows the sequence A G M C I O E K B H N D J P S L from line-to-line, the sampling pulse time A–N in the first line changes from frame-to-frame and is determined by the gating pulse train sequence selector 64. In other words, on the first frame of the sixteen frames, the gating pulse train is arbitrarily selected to start with the A-time pulse and to follow the above listed sequence, line-by-line for sixteen lines and then start back through the sequence. On the second frame, however, the starting pulse on the first line occurs during the E-time interval while the sequence is the same from line-to-line, i.e. E K B H N D J P F L A G M C I O. On the third frame, the starting pulse on the first line is changed to the I-time interval, while the sequence is the same from line-to-line, I O E K B H N D J P F L A G M C. Thus, for each frame, although the first line sampling pulse time changes, the sequence remains the same from line-to-line and is repeated every sixteen lines.

In operation, the nth frame synchronizing pulse received by the gating pulse train sequence selector 64 always insures that the first sampling pulse train for the first line of the first frame always starts at the A-time interval. The horizontal sync pulse $f_h$ triggers the gating pulse train sequence selector 64 to logically switch the gating pulse train timing interval to the above listed sequence from line-to-line. In addition, the vertical sync pulse $f_v$ logically switches the sampling pulse time starting with the first horizontal line from frame-to-frame. Since the gating pulse train sequence selector is illustrated in detail in the previously referenced copending patent application Ser. No. 338,770, the preceding discussion of its operation is believed adequate.

The gating pulse train generator 66 generates a gating pulse every sixteenth time interval. In operation, the gating pule train generator 66 is responsive to the clock pulse sync signal CP received on the dashed line, and divides it by sixteen to generate a gating pulse at the appropriate time interval. This operation can be performed by a circuit of the type described in detail in copending U.S. patent application Ser. No. 338,770.

Of course, it should be understood that if the clock pulse generator is located at the transmitter instead of on a portion of the magnetic drum 34, it is only necessary to use the horizontal sync pulse $f_h$ received on the dashed line and to use a phase lock loop to generate the clock pulse sync signal CP within the gating pulse train generator, as described in detail in copending patent application Ser. No. 338,770. Thus, a clock pulse sync signal CP would be fed from the gating pulse train generator 66 on the dashed line rather than into it.

Figures 2, 3:
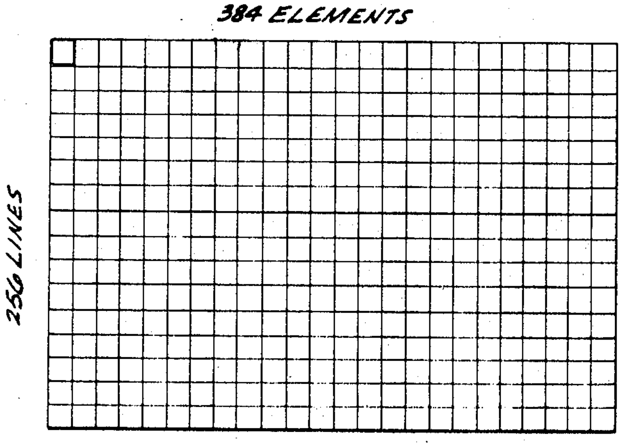
FIG. 2 is a schematic diagram graphically illustrating the area of a representative video picture.
FIG. 3 is a greatly enlarged section of the upper left-hand corner of the video picture of FIG. 2 illustrating an elemental sampling area wherein the sampling pattern for each frame is identified by a block containing the frame member or sequence in which the block is sampled.

The video gate and boxcar detector 60 is gated by the gating pulse train from the gating pulse train generator 66 to selectively sample or encode the full resolution video received from the video amplifier 54 in accordance with the pseudo-random multiple interlace pattern illustrated in FIG. 3. The encoded video is thereafter fed to receiver over the transmission link.

The input to the receiver subsystem includes, as illustrated in FIG. 8, the narrow-band filter 24 which is coupled to receive the encoded video from the transmission link and to feed the filtered encoded video signal to the voltage controlled oscillator 26. The voltage controlled oscillator 26 is operable to frequency moduate the encoded video signal at a center frequency of approximately 1 mHz., with minimum and maximum frequencies of about 800 kHz. and 1200 kHz. In addition, to reduce the frequency modulated FM signal down to the storage density limitations of the magnetic drum 34 (FIG. 1), the circuit of the voltage controlled oscillator 26 is also operable to divide the frequency modulated signal by two. The frequency modulated signal from the voltage controlled oscillator 26 is applied to the record amplifier portion of a record/reproduce circuit 28. In operation, as will be explained in more detail shortly, the record circuits are sequentially and seletcively enabled so that each received frame is sequentially recorded on a distinct one of the plurality of recording tracks on the magnetic drum 34. Thereafter, the same encoded low-resolution frame 1 through 16 is always recorded on the same recording track 1 through 16, respectively.

Referring now to the details of the narrow-band filter 24 and the voltage controlled oscillator 26, reference is made to FIG. 9, wherein the narrow-band filter 24 includes a plurality of inductors **65*a* through 65*d* which are connected in series between the transmission link and an amplifier in the voltage controlled oscillator 26 for conducting lower frequency components. In addition, each of the inductors 65*a* through 65*d* is shunted to a reference terminal by parallel circuit capacitors 67*a* through 67*d*** which alternate high frequency components. This circuit should have no overshoot or ringing in response to a step change in input and has a nearly linear phase vs. frequency characteristics to minimize video signal distortion. Thus, signals outside the required bandwidth are suppressed.

The voltage controlled oscillator 26 includes an amplifier stage 69 which receives the encoded video signal from the filter and applies it to an astable multi-vibrator 71. In operation, the amplifier 69 receives the encoded video signal at the base terminal of a transistor 73 wherein the collector-emitter current is increased and decreased in accordance with the magnitude of the signal applied to the base terminal. As the current in the transistor 73 varies, the corresponding voltage change at the emitter terminal of a transistor 75 also varies as a result of current flow through the emitter-resistor network 76. The AC gain of the amplifier 69 can be adjusted by the variable resistor 78 in the emitter-resistor network. The amplified output signal at the collector of transistor 75 is fed to the astable multivibrator 71.

The astable multivibrator 71 is responsive to the amplified encoded video signal so that the instantaneous frequency deviation in the output signal is proportional to the instantaneous amplitude of the incoming video signal and is thus frequency modulated. Structurally, the astable multivibrator 71 includes a pair of common emitter transistors 78 and 80 having their respective collector terminals cross-coupled to the base terminals of the other transistor through RC timing circuits. In operation, slight differences in the parameters of one transistor circuit will cause one of the transistors 78 or 80 to conduct first. Assuming transistor 78 conducts first, the collector terminal voltage decreases, causing a signal to be conducted through diode 82, capacitor 84, and resistor 86 to reverse bias the transistor 80 off. Thereafter, as the capacitor 84 discharges at a predetermined rate through resistor 88, the voltage drop across capacitor 84 increases until transistor 80 is forward biased. With transistor 80 forward biased, its collector current causes a drop in the voltage at its collector terminal, resulting in diode 90 conducting a signal through capacitor 92 and resistor 94 to reverse bias the base terminal of transistor 78, thereby turning off transistor 78. Thereafter, the capacitor 92 discharges through a resistor 94 at a predetermined rate until the base terminal of transistor 78 is again forward biased and the transistor conducts. This alternate conducting and nonconducting operation is thereafter continued as long as a signal is received from the amplifier 69.

To determine the rate or frequency at which the transistors are alternately turned on and off, the voltage level or instantaneous amplitude of the encoded video received at the junctions of the base terminal of the transistors and the capacitor of the cross-coupled RC charging circuit sets the starting voltage of the RC charging circuit. The starting voltage in effect increases or decreases the time required for the base bias to reach the forward bias level at the RC time constant or predetermined discharging rate.

Since, in operation, the output of the astable multivibrator 71 is operated at a nominal frequency of 1 mHz and between the range of 800 mHz and 1200 mHz, its output in the particular embodiment being described must be reduced to the storage density limitations of the particular magnetic drum 34 used. The frequency modulated signal from the astable multivibrator 71 is reduced in frequency by a $\div 2$ circuit 96 before being recorded. Structurally, the $\div 2$ is a bistable multivibrator including a pair of transistors 98 and 100 having their respective collector terminals cross-coupled with the base terminal of the other transistor. Thus, assuming that transistor 98 is conducting, the signal developed across the collector-resistor 102 and the parallel RC circuit 104 is sufficient to reverse bias the base terminal of the transistor 100, thereby turning off transistor 100. When a negative-going pulse signal is received from the astable multivibrator 71 through the coupling capacitors 106 and 108, a steering diode 110 or 112 is forward biased to conduct the input signal to the base terminal of the nonconducting transistor. The input signal forward biases the nonconducting transistor to a conducting state. Assuming that transistor 100 is now conducting, the collector current results in a reverse bias of the base terminal of the previously conducting transistor 98 as a result of the collector voltage signal developed through a resistor 114 and a parallel RC circuit 116. Thereafter, the bistable multivibrator remains in this state until the next input signal is received from the astable multivibrator 71.

The outputs of the bistable multivibrator stages are fed from their respective collector terminals to the base terminal of common emitter-buffer-amplifier stages 118 and 120, respectively, through parallel RC circuits 122 and 124, respectively. Thus, the output signals from the bistable multivibrator 96 in the voltage-controlled oscillator 26 includes two 180° out-of-phase output signals which are fed to the record amplifiers of the record/reproduce circuit 28.

In addition to the $\div 2$ frequency modulated signal, the voltage-controlled oscillator 26 also generates a substitute video signal which is selectively fed to a reproduce amplifier 42 in the record/reproduce circuit 28, when an encoded video signal is being recorded on a particular channel. To generate this substitute video signal, the frequency modulated output from the astable multivibrator 71 is fed to the base terminal of a buffer amplifier 128. The base terminal signal varies the transistor conduction, whereupon the resulting emitter output signal is selectively fed to the reproduce amplifier 30.

The record/reproduce circuit 28 illustrated in block diagram form in FIG. 8, is representative of the plurality of record/reproduce amplifier circuits which are each associated with a separate or distinct record track on the magnetic drum 34. In operation, the record amplifiers 30 simultaneously receive the encoded low resolution video information from the voltage control oscillator 26 and are sequentially energized to record each low resolution frame, from frame *l* through frame *n*, on the recording tracks *l* through *n*, respectively. The reproduce circuit 42 is operable to continually reproduce the recorded information in parallel for fifteen frame times, as determined by the start record frame signals $SRF_1$ through $SRF_n$ received from the record channel selector 36 illustrated generally in FIG. 1 and in detail in FIG. 11.

To record the low resolution encoded video information, the frequency modulated signal from the voltage control oscillator 26 is simultaneously fed to all of the record amplifiers 130. Each record circuit is sequentially gated by an individual one of the start record frame signals $SRF_1$ through $SRF_n$, one at a time, each for the duration of one low resolution frame time interval. As a result, each individual frame of encoded video information is recorded on a separate and distinct recording channel of the magnetic drum 34. Of course, other magnetic recording mediums could be used, such as magnetic tape.

The operation of the reproduce circuit is such that the recorded information is reproduced on all of the tracks continually and simultaneously in time-base synchronism with one another, except when a record circuit associated with a particular recording track is in a record state. At this time, the substitute video signal from the voltage control oscillator 26 is fed to the reproduce circuit of the record/reproduce circuit 130 during the low resolution frame time during which information is being recorded. In addition, variable attenuation gating signal $V_{agl}$ through $V_{agn}$ related to the amount of storage, from zero storage to full storage, are fed to bias the record/reproduce amplifiers and thereby selectively increase or decrease their output signal level to correspond to the amount of display desired for different display conditions.

Referring now to the details of a representative record/reproduce circuit 130, illustrated in FIG. 10, the frequency modulated, low resolution video signal from the voltage control oscillator 26 is received by an amplifier 134 and alternately turns on the parallel transistors 136 and 138. Structurally, the input lead of each transistor has an isolating diode 140 and 142, respectively, through which the frequency modulated input signal is applied to the base terminals of the transistors 136 and 138, respectively. In addition, the base terminals are clamped to a DC level through diodes 144 and 146 connected to a terminal at a positive potential relative to ground. Hereinafter, a reference to a positive or negative potential will always be with reference to ground unless otherwise stated.

Assuming that the record/reproduce circuit of FIG. 10 is representative of the channel 1 circuits then, the start record frame signal $SRF_1$, applied to the circuit, turns on transistors 150 and 152 for one low resolution frame duration for the record mode. With the transistors 150 and 152 turned on, an emitter voltage signal is applied to a center tap of a read/write head 132 (FIG. 8) associated with the first record channel of the magnetic drum. The alternating outputs from the amplifier 134 are applied across the winding of the read/write head as a square wave current signal, or the equivalent through a gate 154 which includes forward biased diodes 156 and 158. In addition, during the record mode, diode gate 160, which includes diodes 162 and 164, is back-biased to isolate the read/write head from the reproduce amplifier 166.

However, to insure that there is low resolution video information being fed to the decoder, the substitute video signal received from the voltage controlled oscillator 76 is fed into the record/reproduce circuit and is demodulated therein, as will be explained shortly.

At the end of the record mode of operation, the start record frame signal $SRF_1$ returns to a normal level to turn off the transistors 150 and 152, whereupon, the voltage fed to the center tap of the read/write head decreases to a voltage level sufficient for reproducing the recorded information. In addition, the return of the start record frame signal $SRF_1$ reverse biases the diodes 156 and 158 in gate 154 relative to the collector outputs from amplifier 134 and forward biases the diodes 162 and 164 in gate 160 relative to the base terminal inputs into the reproduce amplifier 166. As a result, subsequent frames of low resolution video information cannot be recorded on the recording channel, and the low resolution frame of recorded video information can be continually played back through the reproduce amplifier 166.

The reproduce amplifier 166 includes a pair of transistors 168 and 170 which are coupled to receive the reproduced signal from the gates 160 at their base terminals. The resulting amplified pulse signals having a frequency rate corresponding to the recorded frequency deviation are fed to a full wave rectifier 172 through coupling capacitors 174 and 176.

In addition, the video information can be held and continualy played back as a single frame for an indefinite period of time by applying a hold signal to the emitter terminal of transistor 152. The resultant signal developed at the collector terminal reverse-biases the diodes in gate 154 and forward-biases the diodes in gate 160. As a result, no new video information can be recorded wherein that video information that has been recorded will be continually replayed until the hold signal is removed.

The full wave rectifier 172 includes a pair of diodes 178 and 180 which, in effect, conduct only the positive portions of the complementary outputs from the reproduce amplifier 166 and effectively doubles the frequency of the reproduced video signal. Thus, the frequency of the signal is returned to a frequency range from 800 kHz. to 1200 kHz.

The output from the full wave rectifier 172 is fed to a buffer amplifier including transistor 182 and thence to a zero crossing detector 184.

The zero crossing detector 184 converts the signal received from the buffer amplifier to a square wave having a sharp trailing edge. In operation, the emitter terminal output from the buffer amplifier 182 is AC coupled to the base terminal of transistor 186 through a coupling capacitor 190 wherein changes in the emitter current of transistor 186 create a signal across emitter-resistor 192 which varies the emitter voltage on transistor 188 which alternately cuts off and overdrives the transistor. The resulting square wave signal from the zero crossing detector is fed to a demodulator 194 through a buffer amplifier 196.

The buffer amplifier 196 includes an emitter-follower transistor connected to receive the output from the zero crossing 184 at the base terminal thereof. The output from the buffer amplifier 196 is fed to the demodulator 194.

The demodulator 194 is a one-shot multivibrator which generates output pulses of a constant pulse width. Since the one short multivibrator is triggered by a reproduced video signal and the frequency deviation of the reproduced video signal is proportional to the instaneous amplitude of the low resolution video information, the average value of the output pulses from the demodulator 194 is also proportional to the amplitude of the low resolution video information.

More specifically, the one-shot multivibrator 194 includes a normally-on transistor 197 which is turned off by the input signal received from the zero crossing detector 184 received through the diode 198. In addition, the input signal turns on transistor 199 which provides a low impedance at its emitter terminal to drive a filter 210. In addition, the emitter voltage of transistor 199 is fed to the base terminal of transistor 200 through the speed-up circuit 201 comprising the parallel resistance and capacitance. When transistor 200 is turned on, the voltage at the collector terminal decreases to decrease the voltage across capacitor 202, whereupon, diode 203 is back-biased. With diode 203 back-biased, no base current is supplied to transistor 197 until the voltage across capacitor 202 increases to a predetermined level, as determined by the RC time constant set by the values of capacitor 202, and resistors 204 and 205. When the voltage across capacitor 202 reaches a predetermined level, transistor 197 is turned on, thereby turning off transistor 199 until the next signal is received from the zero crossing detector 184.

A low pass filter 210 is coupled to receive the output pulses from the demodulator 194 and removes the harmonics and the pulse carrier from it. As a result, the output from the filter 210 is a DC signal having an instantaneous amplitude corresponding to the instantaneous amplitude of the original video information. Structurally, the low pass filter 210 includes a series of inductors 212 coupled to pass only the lower frequency components of the signal and a plurality of shunting capacitors 214 coupled to shunt any AC components to a common DC feedback line 216.

In order to compensate for certain differences in the scene, such as variation in the contrast ratios, the level of the DC signal from the filter 210 can be adjusted. In operation, a variable attenuator circuit 220 is operable to control the amplitude of the output signal from the filter 210. In operation, a variable attenuation signal $V_A$, which is adjustable at a potentiometer (not shown) is applied to the base terminal of a transistor 222 through a diode 224. In essence, an operator or viewer can adjustably set this voltage level to a level which will provide the best psychological viewing for a variety of viewing conditions. When the video information is being played back at full resolution, the transistor 222 is normally turned on by a variable attenuation gating signal $V_{ag1}$ received from the decoder circuit 44 (FIG. 11) and applied to the base terminal of transistor 222 through the diodes 226 and 228. When, however, an image of less than full resolution is to be displayed or reproduced, the variable attenuation gating signal $V_{ag1}$ received from the decoder 44 will be switched to a second level, whereupon, the variable attenuation signal $V_A$ set by the operator will then determine the gain of the output signal from the filter 210. In other words, if the playback signal for a moving scene is set to a one-quarter resolution signal, or one-quarter storage, the filter 210 will only produce a full gain output signal for four low resolution frame intervals SFR. Thereafter, for the next twelve low resolution frame time intervals SRF, the attenuation control signal $V_A$ will determine the gain of the output signal from the filter 210. Since the level of the signals during the twelve frame times is a matter of personal preference to the viewer, he can determine how much gain these low resolution frames shall have. The video output from the filter 210 is fed to the base terminal through an emitter follower transistor 230. The resulting emitter voltage signal is fed to the decoder 44 of FIG. 11 as the frame number 1 encoded video information of output line 232.

Referring now to the details of the operation of the decoder 44 illustrated in FIG. 11, the circuit for generating the start record frame signals $SRF_1$ through $SRF_{16}$ is the record channel selector 36. The record channel selector 36 can include a four-stage counter which is reset to zero at each sixteenth frame sync signal received from the transmitter subsystem and is triggered by each vertical sync signal $f_V$. The outputs from the counter are fed to a one-out-of sixteen-transistor, whereupon, the output signals $SRF_1$ through $SRF_{16}$ are sequentially energized, one at a time. These start record frame signals $SRF_1$ through $SRF_{16}$ are fed to the record circuit (FIG. 10) to enable the diode gate 154 and disable the diode gate 160, one at a time. The record channel selector 36 can include a four-stage binary counter and a one-out-of-sixteen diode matrix of the type described in copending patent application ser. No. 338,770. At the end of sixteen low resolution frame time intervals, the sixteenth frame sync signal resets the record channel selector counter to its zero or initial condition.

In order to adjust the frame time and the resolution of the reproduced video information to a level that provides the most pleasing and informative picture for a variety of viewing conditions ranging from still scenes to rapidly moving objects, the number of times that the recorded video information is played back can be adjusted by a variable storage control circuit 250.

In operation, the variable storage control circuit 250 varies the resolution by selectively controlling the number of times that a low resolution video frame is reproduced. For example, for one-quarter storage, each frame of low resolution video information will be reproduced for only four low resolution frame time intervals. For one-half storage, each frame of low resolution information will be reproduced for eight resolution frame time intervals. And for full storage, all of the information will be reproduced for a full sixteen-frame time interval.

Structurally, the variable storage control circuit includes a variable storage selector 252 having a four-stage binary counter which is triggered by the vertical sync pulse $f_v$ and is reset by the output from a frame storage selector switch 254. The selector switch 254 can be a sixteen-position, single-pole switch, each position of which is connected to receive an individual one of sequentially generated start record frame signals $SRF_1$ through $SRF_{16}$, respectively (FIG. 12*a*). Thus, assuming that a one-quarter storage condition has been selected each time the start record frame signal $SRF_4$ is generated by the record channel selector 36, a reset pulse is applied to the four-stage counter in the variable storage selector 252 to reset it to its initial starting condition. The eight outputs from the variable storage counter is applied to a matrix which, in effect, forms sixteen AND gates, wherein the binary count output from the variable storage counter is sequentially translated to a one-out-of-sixteen output. The one-out-of-sixteen outputs is utilized to control the number of times that a low resolution frame will be played back before it is attenuated.

A plurality of control flip-flops 260 are coupled to be set by the start record frame signals $SRF_1$ through $SRF_{16}$ received from the record channel 36 and to be reset by the one-out-of-sixteen outputs from the variable storage selector 252. The flip-flops 260 have nonsymmetrical triggering characteristics so that simultaneous applications of both a set pulse and a reset pulse results in the flip-flops going to the set state. The flip-flops 260 are conventional *r–s* type flip-flops wherein during set, the output of the flip-flops is low and during reset, the output from the flip-flops is high. Thus, when the flip-flops are set by the start record frame signals $SRF_1$ through $SRF_{16}$, the video attenuation gating signals $V_{ag1}$ through $V_{ag16}$ are applied to the record/reproduce circuit of FIG. 10 to provide normal gain. When, however, the flip-flops 260 are in the reset condition, the gain from the record/reproduce circuit is determined by the variable attenuation signal $V_a$ chosen by the operator. Thus, the number of times that a frame of reproduced video information is received by the decoder 44 is determined by the setting on the flip-flops 260.

In order to fully understand the variable storage operation, reference is made to the timing diagram and chart of FIGS. 12*a*–12*c* which is representative of the arbitrarily selected one-fourth storage condition. Thus, assuming that during the first timing interval, the start record frame signal $SRF_1$, as illustrated in FIG. 12*a*, occurs, and that the one-out-of-sixteen outputs (FIG. 12*b*) from the variable storage selector 252 occurs, and both are simultaneously applied to the set S and the reset R input terminals, respectively, of the control flip-flop 260 associated with channel 1. The nonsymmetrical switching characteristics of flip-flop 260 will cause it to go to a set state. Thereafter, for the next four time intervals represented by the start record frame time intervals $SRF_1$ through $SRF_4$, the control flip-flop associated with channels 1, 2, 3 and 4, are all set since they receive both the set signals $SRF_1$ through $SRF_4$ from the record channel selector 36 and the sequentially one-out-of-sixteen reset signals from the variable storage selector 250. However, at the fourth time interval, the start record frame signal $SRF_4$ is applied to the selector switch 254, resulting in an output pulse which is fed to reset the counter in the variable storage selector 250. As a result, the counter is returned to its initial output state, whereupon, it is triggered to a binary one count by the vertical sync signal $f_v$. As a result, the one-out-of-sixteen output signals from the variable storage selector 250 is applied to reset the control flip-flop 260 associated with the number 1 channel, thereby causing the output signal level to go high. Consequently, the output level low resolution video signal received from the record/reproduce circuit 130 will be changed from normal attenuation to the attenuation level selected by the operator. Thus, after being reproduced continually for four time intervals $SRF_1$ through $SRF_4$, as illustrated in FIG. 12*c*, the low resolution video information on channel number 1 no longer has normal gain and can, in effect, form no signal. However, during the same time, the set signal determined by the start record frame signal $SRF_5$, sets the fifth flip-flop 260 in the control flip-flop circuit, whereupon, low resolution video information is received on the fifth channel. Thereafter, during each subsequent time interval $SRF_6$ through $SRF_{16}$, that channel of low resolution video information that has been received four times may no longer be received and is replaced with the video information on a subsequent low resolution video channel. For example, as illustrated in FIG. 12*c*, during the fourth time interval determined by the start record frame signal $SRF_4$, the low resolution video information on channels 1, 2, 3 and 4 is displayed. During the fifth time interval, the low resolution video information on channels 2, 3, 4 and 5 is displayed, etc. through the sixteenth frame time interval. On the seventeenth low resolution frame time interval, again represented by the start record frame signal $SRF_1$, the low resolution video information on channel 1 is played back or received by the decoder over channel 1 along with the video information from channels 14, 15, and 16. Thereafter, the cycle is continually repeated.

In addition to varying the number of times that low resolution video information can be displayed, the decoder circuit is operable to vary the background brightness level to suit the variety of background conditions. As a result, the average displayed brightness may be adjusted so that the displayed information does not go towards black, as less and less storage is selected. Thus, a more pleasing display may be obtained.

The circuit 266 for adjusting the level of the background brightness includes a plurality of parallel brightness level circuits—one for each channel—each operable to supply a variable DC signal to the low resolution video at a summing circuit 310. The brightness level circuits 266 receive a variable DC voltage which is set by the operator on a potentiometer (not shown) and is operable to supply the variable DC signal to the video channels upon which the low resolution video information is not being received. The individual brightness level circuits in the circuit 266 are each selectively responsive to an individual one of the control flip-flops 260 for applying at a desired brightness level a background signal on those channels which are not supplying low resolution video information.

Structurally, a brightness level circuit includes, as illustrated in detail in FIG. 13, a variable voltage circuit 268, responsive to the manually adjusted background level signal VB which is fed in common to a plurality of the parallel drivers, such as 270. The variable voltage circuit 268 includes a transistor 272 coupled to supply a constant current at its collector to an emitter follower transistor 274. The transistor 270 is coupled to one terminal at a positive voltage through a resistor 276 wherein the base terminal is coupled between the terminals at a positive voltage and a terminal at a negative voltage at the junction between a resistor 278 and a diode 280 and resistor 282. A shunting capacitor 284 is also connected between the collector terminal of transistor 272 and the electrical supply terminals. The voltage at the emitter terminal of the emitter follower transistor 274 is set by the adjusted DC voltage $V_B$ received from a background level signal control device such as a potentiometer. The emitter voltage forms the background level signal which is fed simultaneously to a plurality of parallel circuit drivers, such as 270.

The drivers 270 receive the variable level DC background voltage and are selectively gated by an output from a corresponding control flip-flop 260 in the variable storage circuit so that the variable background level voltage is applied to the corresponding video channel when the control flip-flop is in a reset state (high) and is not applied to the corresponding channel when the control flip-flop 260 is in a set state (low). More specifically, when the set signal, which is at a relatively low voltage level, is applied to the driver, a transistor 290 is reverse-biased and turned off and transistor 292 is forward-biased and turned on. As a result, the output terminal 294 is shunted to ground potential through the collector-emitter terminals of transistor 292. This ground reference level signal is applied to the corresponding low resolution video channel and serves to establish a DC level for the video base line.

When, however, a reset signal, which is at a relatively high voltage level, is received by the driver 270, the transistor 292 is reverse-biased and turned off and transistor 290 is forward-biased and turned on. With transistor 290 turned on, the variable background DC level received from the emitter terminal of transistor 274 is conducted through the diodes 296, 298, 300, and 302 to the output terminal 294. As a result, the video base line is established by the manually adjustable background level control. In addition, the diodes 296 through 302 allow the transistor 290 to conduct in the normal high beta direction regardless of the direction of current flow at the output terminals 294.

The played-back low resolution video is received on the parallel video channels and is summed with the background level signal at the summing circuit 310. The summed signals are then applied to video gates 312 which are sampled in response to sampling signals received from pulse generators 314 in accordance with the pseudo-random, multiple interlace sampling pattern described with reference to the graph of FIGS. 2 and 3. The sampled outputs from the video gates 312 are fed in parallel to an OR gate 316 where they are combined on a single output line as a serial wideband video signal.

Referring now to the details of the summing circuits 310, the video gate 312, the pulse generator 314, and the OR circuit 316, one channel is illustrated schematically in FIG. 14. The summing circuit 310 receives the reproduced low resolution video signal from the reproduce amplifier and the variable DC background level signal from the circuit 266, adjusting the level of background brightness 266. The low resolution video is summed and the variable brightness DC signals are summed at the base of an emitter follower transistor 320. The capacitor 324, resistor 326, and diode 328 form a clamp circuit which references the base line of the incoming video to the variable background DC level. During a frame, transistor 330 receives no signal $\overline{V}$ and is cut off during the entire frame and, thus, does not affect the clamp circuit. Since, on a subsequent frame, a different brightness level may be used, a signal $\overline{V}$ is received during the vertical blanking period, and is applied to the base terminal of the transistor 330 through a resistor 332 to turn on the transistor. As a result, the charge on capacitor 324 may be discharged through the collector-emitter circuit path of transistor 330. Thereafter, the new variable background signal is summed at the base terminal and is utilized for the video base line reference. As a result, the signal level on the emitter terminal of transistor 320 is a composite of the variable background DC signal and the low resolution encoded video signal, frame-by-frame. This composite signal is then fed to a video gate circuit 312.

The video gate circuit 312 receives the composite video signal wherein the signal is sampled in accordance with a pseudo-random, multiple interlace gating pulse received from the pulse generator 314. The transistor 350 in the video gate is normally off, since the voltage level at the junction of resistor 352 and the diode 354 is normally at a level that reverse-biases the diode. When, however, the pulse generator 314 generates a gating pulse, the transistor 350 is turned on and conducts the composite video signal to a diode of the OR gate 316.

The pulse generator 314 is triggered to generate sampling pulses of a predetermined pulse duration (340 nanoseconds) in response to trigger signals associated with the pseudo-random, multiple interlace technique, and is inhibited during the horizontal and vertical blanking period. Structurally, the pulse generator includes a pair of normally off transistors 360 and 362. When a trigger pulse is received at the base terminal of transistor 360 through the coupling capacitor 364 and at the collector terminal of transistor 362 through the parallel RC circuit 366, the transistors are turned on and conduct a six-volt signal through diode 368 and the emitter collector terminals of transistor 360 to generate a voltage signal across resistor 352. To fix the duration of the signal developed across resistor 352, the collector signal is fed through a diode 370 to an RC timing circuit including a series capacitor 372 and a parallel resistor 374. By properly selecting the resistance value of resistor 374, the time, at which a voltage signal of a sufficient magnitude to turn off transistor 362, is fed to the base terminal thereof through a diode 376, is controlled. When the transistor 362 is turned off, the change in the collector signal is conducted through the parallel RC circuit 366 to the base terminal of transistor 360 to turn it off. Thus, the sampling pulse having a duration of 340 nanoseconds is fed to the video to enable the video gate 312, in the manner previously described.

The gating pulse train generator 400, the gating pulse train sequence selector 402, and the pulse train selector gates that control the triggering of the pulse generators 314 can be understood with reference back to FIG. 11.

The gating pulse train sequence selector 402 is similar to record channel selector 36 in that it includes a four-stage counter 404 that is triggered by the delayed horizontal sync signal (7.68 kHz.) and is reset by the vertical sync signal (30 Hz.). The horizontal sync signal $f_h$ is delayed to compensate for any delay and rise time characteristics of the previously described filters. The output terminals from the counter 404 are applied to a translator matrix 406 which, in effect, forms sixteen AND gates. The output signals from the counter 404 are converted to a one-out-of-sixteen outputs by the matrix 406. In operation, as the counter is triggered or stepped, the outputs from the matrix 406 are energized, one-by-one, in sequential order. At the end of a low resolution frame, the counter 404 is reset by the vertical sync signal $f_v$. The one-out-of-sixteen outputs is applied to pulse train selector gates 416 in the gating pulse train generator 400.

The gating pulse train generator 400 is responsive to the clock pulse sync signal CP (2.94 mHz.) and the delayed horizontal sync signal $f_h$ (7.68 kHz.) and is operable to trigger the pulse generators 314, one at a time, so that the parallel channels of video information will, when combined on the single output of OR circuit 316, be multiply interlaced, as represented by the chart of FIG. 3.

Structurally, the gating pulse train generator 400 includes an eight-stage ÷16 counter 410 which is triggered by the clock pulse sync signal CP and is reset every horizontal scan line by the delayed horizontal sync signal $f_h$. The individual flip-flops in the eight-stage counter can be conventional J–K flip-flops, such as the F$\mu$L–92329, manufactured by the Fairchild Semiconductor Company and illustrated in their brochure dated May 1965. In operation, the ÷16 counter 410 is initially in an all zero state for its 32 outputs. The J–K flip-flop stages are coupled so that, as a clock pulse signal triggers the counter, the counter shifts and is filled with ones, one-by-one. After eight clock pulses time intervals, the counter 410 is then emptied, one stage at a time, until after eight more clock pulse time intervals, the counter 410 is completely empty or in an all zero state. Thus, a complete cycle of counter 410 requires sixteen clock pulse time intervals. Thereafter, the cycle is repeated.

The sixteen outputs from the eight stages of the counter 410 are fed in parallel to sixteen buffer amplifiers 412. The buffer amplifiers 412 are energized by the output from the counter 410 so that eight of the sixteen parallel outputs from the buffer amplifier are energized at any instant of time. Structurally, an individual buffer amplifier (FIG. 15) can include a grounded emitter transistor 418, wherein the output from flip-flop in counter 404 is fed to the base terminal through a resistor and the collector terminal is coupled to one input terminal of all of the NAND circuits of pulse train selector gates 116.

The outputs from the buffer amplifiers are thus fed in parallel to pulse train selector gate 416 along with the one-out-of-sixteen outputs from the gating pulse train sequence selector 402.

Referring back to FIG. 3, the pseudo-random sampling pattern is such that the first sample on a horizontal line is taken at a different time interval from line-to-line, and is thereafter sampled every sixteen pulse time intervals to the end of the horizontal line in order to obtain the multiple interlace features. Explaining this in the terms of the circuitry illustrated in FIG. 11, during the first time interval A on line 1, the video information on channel 1 will be sampled at video gate 312. On the second time interval B on line 1, the fifth channel will be sampled, on the third time interval C, the ninth video channel will be sampled, etc.

In order to attain this multiple interlace, the pulse train selector gates 416 are responsive to the one-out-of-sixteen outputs from the gating pulse train sequence selector 402, and the eight-out-of-sixteen outputs from the buffer amplifiers 412 of the gating pulse train generator 400. Structurally, the pulse train selector gate 416 includes sixteen parallel logic channels each being operable to trigger an individual one of the pulse generators 314 for sampling the video information at the individual video gates 312 of the individual low resolution video channels. Each individual gating channel or pulse train selector gate 416 includes sixteen parallel NAND gate circuits 420, each having sixteen outputs which are connected to an OR circuit 422. In explaining the operation of the gating of the pulse train selector gate 416, reference is made to the logic arrangement for the number one low resolution video channel.

The operation of the NAND gate 420 and OR gate 422, associated with channel 1, can be best understood with reference to the circuit diagram of FIG. 16. In operation, one of the sixteen inputs received from the matrix 406 is at a high voltage level relative to the other fifteen inputs. Assuming then, that this is the first time interval A on the first line of the first frame, the signal applied to the input terminal will, if the buffer amplifier associated with that NAND gate is turned on, cause current to flow through the resistor 430 and diode 432 and through the collector of the buffer amplifier (FIG. 15). This current conduction causes the voltage level at the anode of diode 434 to go low. In addition, since no other input to the NAND gates from the matrix 406 is high, all of the other NAND gates illustrated in block diagram form, will also maintain the anode of the corresponding diodes in the OR circuits 422 low. As a result, there is no base drive through the diode 446 to the transistor 448. Consequently, the transistor 448 is turned off and the signal level of the collector terminal is high relative to when the transistor is on. When the counter 410 of the gating pulse train generator 400 turns off the buffer amplifier associated with the diode 432, no current can flow through the diode 432. As a result, the anode of diode 434 goes more positive and causes the diode 446 to conduct, turning on the transistor 448. When the transistor 448 is turned on, the voltage at the collector terminal goes more negative and generates a fast-falling waveform. This fast-falling waveform is fed to trigger the pulse generator 314 associated with channel 1 to sample the information on the associated video gate 312 for 340 nanoseconds. After eight clock pulse time intervals, the buffer amplifier, associated with diode 432, is again turned on by the counter 410, thereby decreasing the potential at the anode of diode 434 and removing the base drive from the transistor 448. As a result, the transistor 448 is turned off.

During the second sampling time interval of the first line, the NAND gate and OR circuit, associated with the number 5 video channel, generates a gating pulse that triggers the pulse generator 314 associated with that channel. The output from the video gate 312 associated with the fifth channel is enabled and samples the video information received thereat. Since the operation of all of the selector gate channels is substantially the same except for the logic timing, the above description with reference to channel 1 can be considered descriptive of these other channels.

During the horizontal and vertical blanking times, the pulse generators 314 and the video gate 312 are inhibited so that they do not erroneously sample the information. The circuit 450 for generating the inhibit pulses includes a pair of pulse generator 452 and 454 which are coupled to an OR circuit 456. One of the pulse generators 452 is triggered by the horizontal sync signal $f_v$ and generates a pulse having a duration (2.3 milliseconds) equal to the vertical flyback time. The other pulse generator 454 is triggered by the delayed horizontal sync signal $f_h$ and generates an output pulse equal to the horizontal flyback time. These output signals have a negative polarity and are fed through the OR circuit 256 to the inhibit input terminal of the pulse generator 314 (FIG. 14).

Referring now to the details of inhibit pulse generator 450, reference is made to the schematic diagram of FIG. 17. Structurally, the pulse generator 452 is a one-shot multivibrator which includes a pair of transistors 460 and 462 which are cross-coupled from collector-to-base. In operation, the vertical sync pulse $f_v$ received at the base terminal of transistor 460 through the diode 464 and coupling capacitor 466 turns off the transistor 460. The voltage at the collector terminal increases and is applied to the base terminal of transistor 462 through the parallel RC circuit 468. The signal received at the base terminal turns on transistor 462 thereby generating a negative-going pulse at the collector terminal. This negative-going pulse signal is fed through diode 463 and capacitor 465 to the base terminal of transistor 460. Thereafter, charge of the capacitor 465 through resistors 467 develops a voltage across the associated resistor so that, after a predetermined time interval, the base terminal of transistor 460 is biased to turn on the transistor 460 and turn off the transistor 462. By a proper selection of the circuit components for capacitor 465 and resistors 467, the time that the transistor 462 is on can be set. In the particular embodiment being described, the duration that the transistor 462 is on is set to 2.3 milliseconds. The negative-going output pulse is then fed through a diode of the OR circuit 456 to turn on a buffer amplifier 470.

The pulse generator 454 is also a one-shot multivibrator with the exception that it is trigered by the delayed horizontal sync signal $f_h$, and the RC timing components are selected to turn the output stage transistor on for only 20.8$\mu$ seconds. The output from the pulse generator 254 is also fed through a diode of OR gate 456 to turn on the buffer amplifier 470.

The buffer amplifier 470 includes transistor 472 coupled to receive, at its base terminal, the output signal from the OR gate 456 through a resistor 474. When transistor 472 is turned on by an output from the OR circuit, the voltage developed at the collector terminal is a negative-going pulse which is coupled to inhibit the pulse generators 314 during the horizontal flyback blanking and the vertical flyback blanking.

In addition to inhibiting the pulse generators 314 during the vertical flyback blanking, the output from pulse generator 454 generates a signal $\overline{V}$ which is utilized to control the discharge of the summing circuit (FIG. 14) between frames. This permits the base line reference for the encoded low resolution video information to be changed on a frame-by-frame basis. This discharge control signal V can have a duration of 1.7 milliseconds and is generated by a one-shot multivibrator 480 which is triggered by the output from the pulse generator 452. The one-shot multivibrator 480 operates in substantially the same manner as the one-shot multivibrator described with reference to the pulse generator 452 with the exception that the values of the RC circuit are selected so that a pulse having a duration of 1.7 milliseconds is generated.

The resultant output from the OR circuit 316 can thereafter be applied to a monitor (FIG. 1) through an output cable driver 490. The output cable driver can include a pair of emitter-followers cascaded to provide a low output impedance for driving the cable capacitance and the input resistance of the monitor. In addition, clamping circuits can be used to reference the base line of the video output to approximately zero volts, if desired.

Of course, sampling modes can be utilized other than the above described pseudo-random sampling patterns. For example, the "wideband video" from the television camera 20 can be repeatedly sampled in the sequence A through P and the video information associated with each information sampling time A through P can be stored on a separate and distinct recording track *l* through *n* (16) respectively, of the recording medium 34.

While salient features have been illustrated and described with respect to a particular embodiment, it should be readily apparent that modifications can be made within the spirit and scope of the invention, and it is therefore not desired to limit the invention to the exact details shown and described.

What is claimed is:

1. In a television system of the type in which sequential low resolution frames of video information are spatially interrelated in a pseudo-random pattern wherein a plurality of *n* frames of spatially interrelated low resolution video information, when superimposed, form a frame of higher resolution video information, the combination comprising:

means coupled to receive the sequential frames of low resolution video information and being operably responsive to the video information for selectively gating the video information frame-by-frame;

storage means coupled to receive the gated information for storing the separate frames of low resolution video information at distinct recording portions thereof;

playback means coupled to said storage means for continually and simultaneously playing back the frames of recorded video information in time-base synchronism with one another from said storage means; and decoder means coupled to receive the time-base synchronized video information for combining, in accordance with the random pattern, a selected number of the frames of the simultaneously played back low resolution video information into a frame of video information corresponding to a higher resolution than the resolution of a single low resolution frame wherein the selected number of frames of low resolution video information are at a fixed number in a range from one to *n*.

2. The combination of claim 1 in which said decoder means includes selector means operably coupled to control the number of times that a frame of stored video information is continually played back.

3. The combination of claim 2 in which said decoder further includes attenuation means coupled to said selector means and said playback means for selectively attenuating the frames of played-back video information after the information has been played back the selected number of times.

4. The combination of claim 2 further including means coupled to said decoder means for adjustably setting the background brightness level of the frames of played-back video information during the selected frame time intervals that the stored information is not being played back.

5. The combination of claim 1 in which said storage means is a circulating memory wherein each frame of low resolution video information is recorded on a separate channel during an interval corresponding to one circulation cycle.

6. The combination of claim 5 in which said decoder means includes selector means operably coupled to control the number of frame times that a frame of stored video information is continually played back.

7. The combination of claim 6 in which said decoder further includes attenuation means coupled to said selector means and said playback means for selectively attenuating the frames of played-back video information after the information has been played back the selected number of times.

8. The combination of claim 6 further including means coupled to said decoder means for adjustably setting the background brightness level of the frames of played-back video information during the selected frame time intervals that the stored information is not being played back.

9. The combination of claim 2 in which said selector means is coupled to playback a selected number of sequential frames of low resolution video information for feeding the video information being recorded to said playback means in time-base synchronism with the selected number of continually played-back video information previously recorded.

10. The combination of claim 1 in which said storage means is a magnetic drum operably connected to record the received frames of low resolution video information on distinct recording channels thereof during one complete revolution of said magnetic drum.

11. The combination of claim 10 in which said decoder means includes selector means operably coupled to control the number of frame times that a frame of stored video information is continually played back.

12. The combination of claim 11 in which said decoder further includes attenuation means coupled to said selector means and said playback means for selectively attenuating the frames of played-back video information after the information has been played back the selected number of times.

13. The combination of claim 11 further including means coupled to said decoder means for adjustably setting the background brightness level of the frames of played-back video information during the selected frame time intervals that the stored information is not being played back.

References Cited

UNITED STATES PATENTS 2,824,904 2/1958 Toulon.
3,309,461 3/1967 Deutsch.
3,377,423 4/1968 Lippel.

RALPH D. BLAKESLEE, Primary Examiner

B. LEIBOWITZ, Assistant Examiner